US011644724B2

(12) United States Patent
Fujikawa

(10) Patent No.: US 11,644,724 B2
(45) Date of Patent: May 9, 2023

(54) DISPLAY DEVICE INCLUDING SYNCHRONIZATION LINES

(71) Applicant: SHARP KABUSHIKI KAISHA, Sakai (JP)

(72) Inventor: Yohsuke Fujikawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 54 days.

(21) Appl. No.: 17/183,846

(22) Filed: Feb. 24, 2021

(65) Prior Publication Data

US 2021/0271140 A1 Sep. 2, 2021

(30) Foreign Application Priority Data

Mar. 2, 2020 (JP) .............................. JP2020-034962

(51) Int. Cl.
*G02F 1/1362* (2006.01)
*G06F 3/041* (2006.01)
*G02F 1/1335* (2006.01)
*G06F 3/044* (2006.01)
*G02F 1/1333* (2006.01)

(52) U.S. Cl.
CPC .... *G02F 1/136286* (2013.01); *G02F 1/13338* (2013.01); *G02F 1/133514* (2013.01); *G06F 3/044* (2013.01); *G06F 3/0412* (2013.01); *G06F 3/04164* (2019.05)

(58) Field of Classification Search
CPC ........... G02F 1/136286; G02F 1/13338; G02F 1/133514; G06F 3/04164; G06F 3/412; G06F 3/044

USPC .......................................... 345/98, 100, 174
See application file for complete search history.

(56) References Cited

U.S. PATENT DOCUMENTS

| | | | |
|---|---|---|---|
| 8,610,845 B2* | 12/2013 | Lee | G02F 1/133512 349/44 |
| 2001/0022572 A1* | 9/2001 | Murade | G09G 3/3648 345/98 |
| 2002/0018169 A1 | 2/2002 | Kato | |
| 2015/0332644 A1* | 11/2015 | Fujikawa | G09G 3/3611 345/100 |
| 2017/0205958 A1* | 7/2017 | Kurasawa | G06V 40/13 |

(Continued)

FOREIGN PATENT DOCUMENTS

JP 2001-215892 A 8/2001

*Primary Examiner* — Prabodh M Dharia
(74) *Attorney, Agent, or Firm* — ScienBiziP, P.C.

(57) ABSTRACT

A display device includes a first member, a second member, image signal lines, signal sources, synchronization line terminals, and synchronization lines. The first member includes a display area. The second member includes a plate surface greater than the plate surface of the first member and a display area. The second member includes a covered portion covered with the first member and an uncovered portion not covered with the first member. The image signal lines are disposed in the covered portion. The signal sources are mounted to signal source mounting areas of the uncovered portion. The synchronization line terminals are disposed in the signal source mounting areas and coupled to the signal sources. The synchronization lines are disposed in the covered portion and the uncovered portion and coupled to the synchronization line terminals. Some of the synchronization lines cross a border between the covered portion and the uncovered portion.

20 Claims, 14 Drawing Sheets

(56) References Cited

U.S. PATENT DOCUMENTS

2018/0004030 A1\* 1/2018 Yamaguchi .......... H05K 1/0269
2018/0173036 A1\* 6/2018 Kim ................. G02F 1/133524
2018/0275445 A1\* 9/2018 Katagiri ............ G02F 1/133305

\* cited by examiner

DISPLAY DEVICE INCLUDING SYNCHRONIZATION LINES

CROSS-REFERENCE TO RELATED APPLICATION

This application claims priority from Japanese patent application No. 2020-034962 filed on Mar. 2, 2020. The entire contents of the priority application are incorporated herein by reference.

TECHNICAL FIELD

The technology described herein relates to a display device including synchronization lines.

BACKGROUND

A known liquid crystal display device includes a liquid crystal display panel that includes an upper glass substrate and a lower glass substrate. The lower glass substrate is larger than the upper glass substrate. The upper glass substrate is disposed over the lower glass substrate such that a portion of the lower glass substrate is uncovered with the upper glass substrate. An upper surface of the uncovered portion of the lower glass substrate includes four semiconductor chip mounting areas that are linearly arranged. Power supply lines including connecting terminals are disposed in right edge sections of the semiconductor chip mounting areas. A flexible printed circuit board includes power supply relay lines disposed on a lower surface of a band portion of the flexible printed circuit board to connect the power supply lines in the adjacent semiconductor chip mounting areas. According to the configuration, a width of the band portion of the flexible printed circuit board and a single-sided wiring configuration can be simplified.

The liquid crystal display device includes one flexible printed circuit board connected to the liquid crystal display panel that includes four semiconductor chips. In the liquid crystal display device, an area required for the flexible printed circuit board is reduced and the single-sided wiring configuration is simplified. However, current demands for liquid crystal display devices include synchronization of semiconductor chips. To satisfy the demands, the liquid crystal display devices may require synchronization lines. In the liquid crystal display device having the configuration described earlier, a sufficient space cannot be provided for the synchronization lines.

SUMMARY

The technology described herein was made in view of the above circumstances. An object is to provide a technology for easy arrangement of synchronization lines.

A display device includes a first member, a second member, image signal lines, signal sources, synchronization line terminals, and synchronization lines. The first member has a plate shape and includes a display area within a plate surface of the first member. The second member has a plate shape and includes a plate surface greater than the plate surface of the first member and a display area within the plate surface of the second member. The second member includes a covered portion that is covered with the first member and an uncovered portion that is not covered with the first member. The image signal lines are disposed at least in the covered portion to transmit image signals. The signal sources are mounted to signal source mounting areas of the uncovered portion separated from each other to supply the image signals to the image signal lines. The synchronization line terminals are disposed in the signal source mounting areas. The synchronization line terminals are coupled to the signal sources. The synchronization lines are disposed in the covered portion and the uncovered portion. The synchronization lines are coupled to the synchronization line terminals, respectively. The synchronization lines transit synchronization signals for synchronization of the signal sources. Some of the synchronization lines extend to cross a border between the covered portion and the uncovered portion.

According to the technology described herein, the synchronization lines can be easily arranged.

DETAILED DESCRIPTION

First Embodiment

Figure 1:
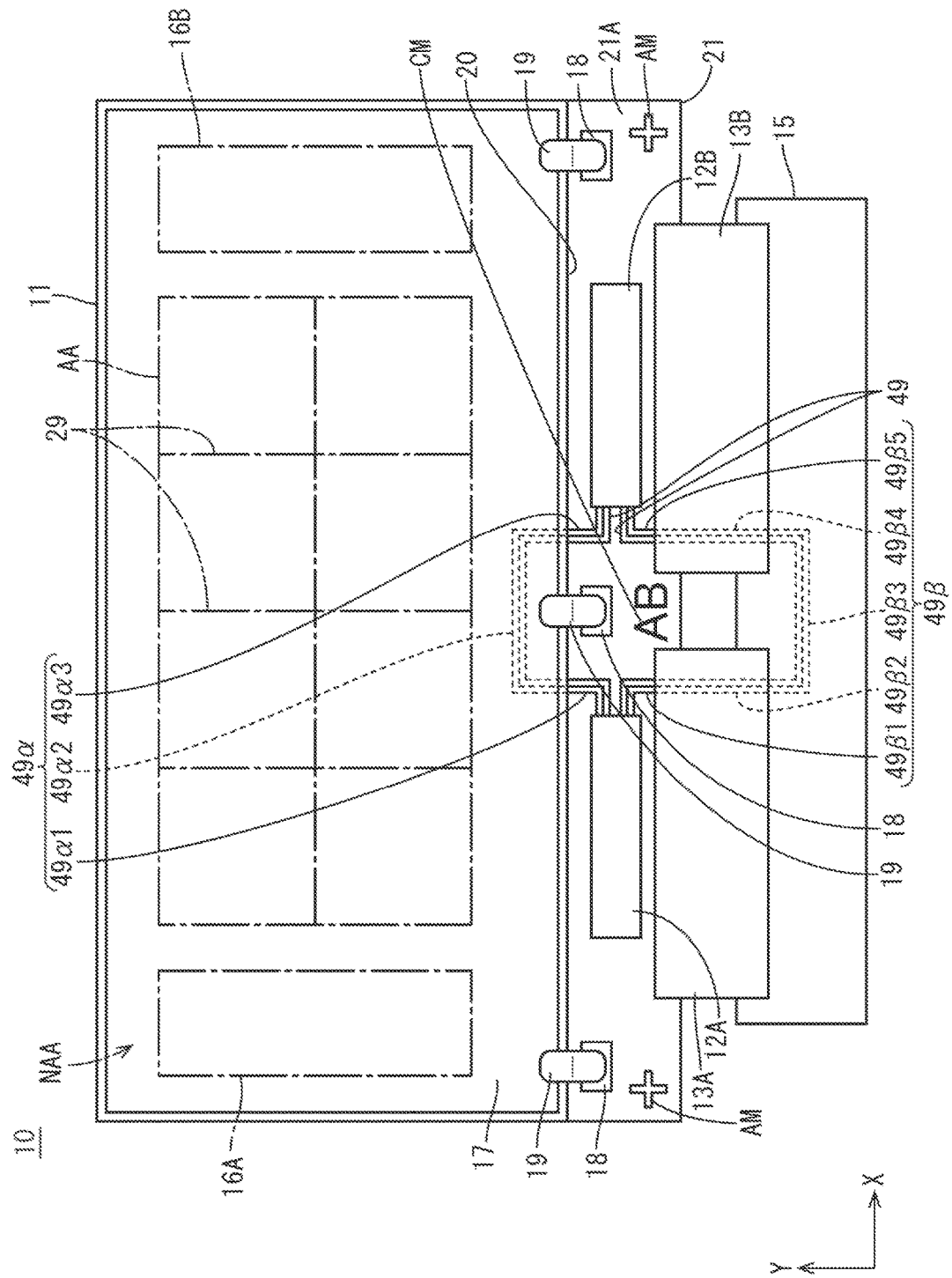
FIG. 1 is a plan view illustrating a liquid crystal panel, a flexible printed circuit board, and a printed circuit board included in a liquid crystal display device.

A liquid crystal display device 10 having a display function and a touch panel function (a position input function) according to a first embodiment will be described with reference to FIGS. 1 to 6. The liquid crystal display device 10 is an example of a display device or a display device having a position detecting function. X-axes, Y-axes, and Z-axes may be present in the drawings. The axes in each drawing indicate directions that correspond to directions indicated by the respective axes in other drawings. An upper side and a lower side in FIGS. 2, 5 and 6 correspond to a front side and a back side of the liquid crystal display device 10, respectively.

As illustrated in FIG. 1, the liquid crystal display device 10 has a horizontally-long rectangular overall shape. The liquid crystal display device 10 includes a liquid crystal panel (a display panel) and a backlight (a lighting device). The liquid crystal panel 11 displays images using light from the backlight that is disposed behind the liquid crystal panel 11. The backlight includes light sources (such as LEDs) configured to emit white light and an optical member configured to exert optical effect on the light from the light sources and covert the light into planar light. The liquid crystal panel 11 includes a display area AA in which the images are displayed in the middle and a non-display area NAA that has a frame shape to surround the display area AA in which the images are not displayed.

The liquid crystal panel 11 includes substrates bonded to each other. One of the substrates on the front side is a CF substrate 20 (a first member). The other one of the substrates on the back side is an array substrate 21 (a second member). The CF substrate 20 and the array substrate 21 includes glass substrates. Various kinds of layers are disposed on an inner surface of each of the glass substrates. The liquid crystal panel 11 further includes a liquid crystal layer 22 (a medium layer) and a sealant 23. The liquid crystal layer 22 is disposed between the CF substrate 20 and the array substrate 21. The liquid crystal layer 22 includes liquid crystal molecules having optical characteristics that change according to application of an electric field. The sealant 23 is disposed between edge portions of the CF substrate 20 and the array substrate 21 to seal the liquid crystal layer 22 within an internal space between the CF substrate 20 and the array substrate 21. The sealant 23 is formed in a frame shape (a ring shape without a brake) to surround the liquid crystal layer 22. The sealant 23 may be made of an ultraviolet curable resin (a light curable resin). In production of the liquid crystal panel 11, the sealant 23 is applied to at least one of the CF substrate 20 and the array substrate 21, the CF substrate 20 and the array substrate 21 are bonded together, and ultraviolet rays (light) are applied to the sealant 23 through the array substrate 21. Through the above steps, the sealant 23 is cured and the internal space between the CF substrate 20 and the array substrate 21 is closed, that is, the liquid crystal layer 22 is sealed. Polarizing plates 14 are attached to outer surfaces of the CF substrate 20 and the array substrate 21, respectively.

Figure 2:
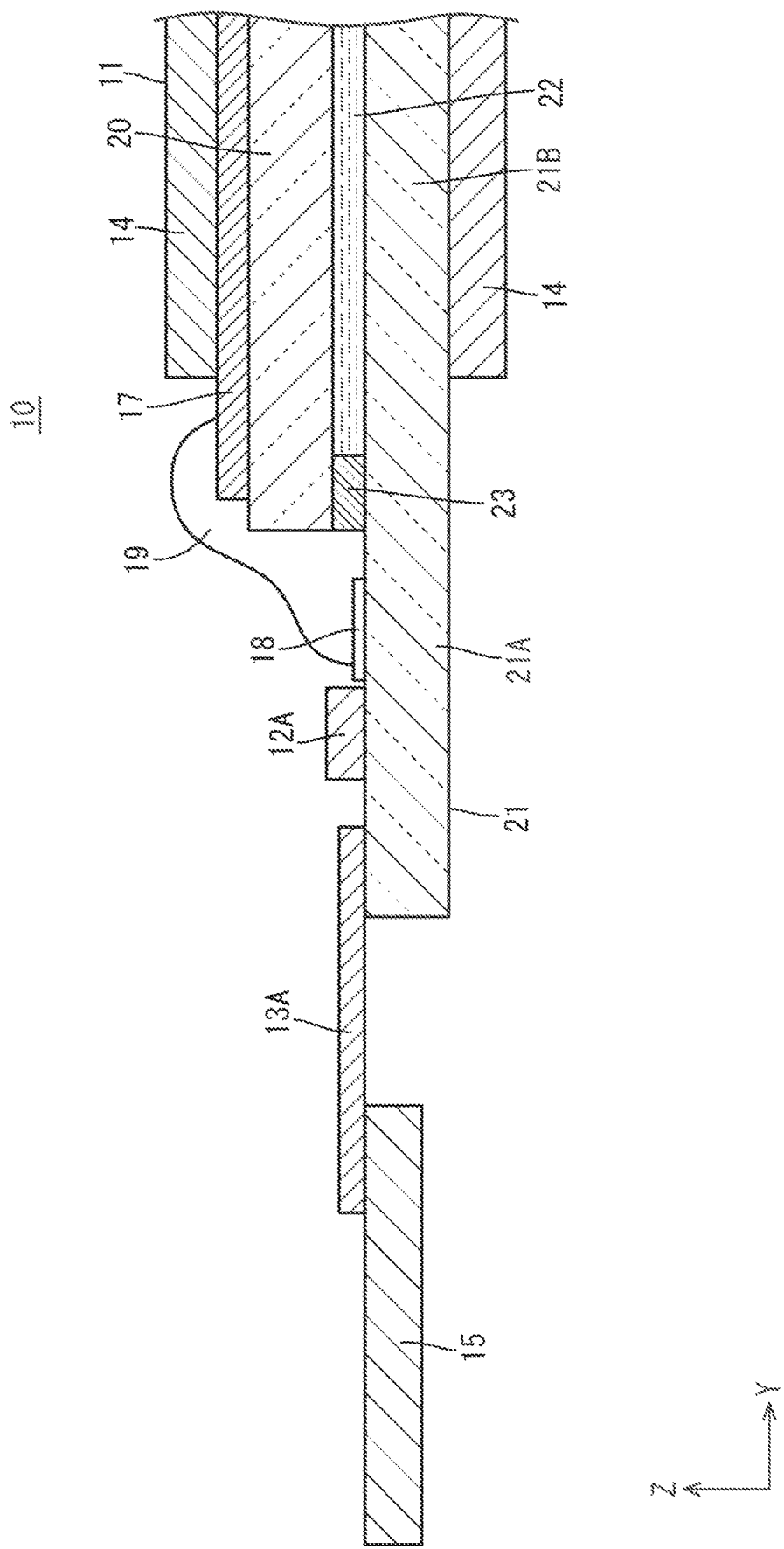
FIG. 2 is a cross-sectional view illustrating the liquid crystal panel, the flexible printed circuit board, and the printed circuit board.

As illustrated in FIGS. 1 and 2, the CF substrate 20 has a short dimension less that a short dimension of the array substrate 21. The CF substrate 20 is disposed over the array substrate 21 and bonded to the array substrate 21 with one of long edges of the CF substrate 20 aligned with one of the long edges of the array substrate 21. A portion of the array substrate including the other long edge is not covered with the CF substrate 20 and defined as an uncovered portion 21A. An entire area of the uncovered portion 21A is included in the non-display area NAA. A first driver 12A (a first signal source), a second driver 12B (a second signal source), a first flexible printed circuit (FPC) board 13A, and a second flexible printed circuit (FPC) board 13B are mounted on the uncovered portion 21A to supply various kinds of signals related to the display function and the touch panel function, which will be described later. The first signal source 12A and the second signals source 13B may be referred to as signals sources. A portion of the array substrate 21 other than the uncovered portion 21A is covered with the CF substrate 20 and defined as a covered portion 21B.

The first driver 12A and the second driver 12B include LSI chips that include driver circuits therein. The first driver 12A and the second driver 12B are mounted to a first driver mounting area and a second driver mounting area of the uncovered portion 21A of the array substrate 21 through chip on glass (COG) technology. The first driver 12A and the second driver 12B process various kinds of signals transmitted through the first FPC board 13A and the second FPC board 13B. As illustrated in FIGS. 1 and 2, the first driver mounting area to which the first driver 12A is mounted is between the display area AA and the first FPC board 13A. The second driver mounting area to which the second driver 12B is mounted is between the display area AA and the second FPC board 13B. The first driver mounting area and the second driver mounting area are separated from each other in the X-axis direction, that is, the first driver 12A and the second driver 12B are separated from each other in the X-axis direction. The first driver 12A and the second driver 12B supply various kinds of signals (e.g., image signals, touch signals, control signals) to source lines 27 and touch lines 30 in the display area AA and a first gate circuit 16A and a second gate circuit 16B. The first driver 12A and the second driver 12B are configured to send and receive synchronization signals through synchronization lines 49, which will be described later. Operation of the first driver 12A and the second driver 12B can be synchronized according to the synchronization signals.

The first FPC board 13A and the second FPC board 13B include bases and wiring patterns. The bases are made of synthetic resin having insulating properties and flexibility (e.g., polyimide-based resin). The patterns include traces formed on the bases. As illustrated in FIGS. 1 and 2, the first FPC board 13A and the second FPC board 13B include first ends coupled to the uncovered portion 21A of the array substrate 21 and second ends coupled to a printed circuit board (PCB) 15. The first ends of the first FPC board 13A and the second FPC board 13B are coupled to an edge of the uncovered portion 21A farther from the display area AA such that the first driver 12A is located between the display area AA and the first FPC board 13A and the second driver 12B is located between the display area AA and the second FPC board 13B. The first FPC board 13A and the second FPC board 13B are separated from each other in the X-axis direction. The first FPC board 13A and the second FPC board 13B are separated from the first driver 12A and the second driver 12B in the Y-axis direction, respectively. The PCB 15 has a long dimension greater than a sum of long dimensions of the first FPC board 13A and the second FPC board 13B and a gap between the first FPC board 13A and the second FPC board 13B. The PCB 15 is coupled to signal sources and configured to transmit various kinds of signals from the signal sources to the first FPC board 13A and the second FPC board 13B.

As illustrated in FIG. 1, the first gate circuit 16A and the second gate circuit 16B are mounted to the covered portion 21B of the array substrate 21 in the non-display area NAA such that the display area AA are sandwiched between the first gate circuit 16A and the second gate circuit 16B in the X-axis direction. Each of the first gate circuit 16A and the second gate circuit 16B has a band shape having a long dimension in the Y-axis direction. The first gate circuit 16A and the second gate circuit 16B are adjacent to the short edges of the covered portion 21B, respectively. The first gate circuit 16A and the second gate circuit 16B supply scan signals to gate lines 26 in the display area AA. The first gate circuit 16A and the second gate circuit 16B are monolithically fabricated on the array substrate 21. The first gate circuit 16A and the second gate circuit 16B include output circuits that output scan signals at predefined timing and buffer circuits that amplify scan signals. The first gate circuit 16A and the second gate circuit 16B receive various kinds of signals from the first driver 12A and the second driver 12B 2.

As illustrated in FIGS. 1 and 2, a conductive layer 17 is formed on an outer plate surface of the CF substrate 20 on an opposite side from the array substrate 21, that is, on a display surface. The conductive layer 17 includes a transparent electrode film that is solid and formed in about entire area of the plate surface of the CF substrate 20. The conductive layer 17 is disposed between the CF substrate 20 and the polarizing plate 14 on the front side. The conductive layer 17 includes outer edges located outer than outer edges of the polarizing plate 14 on the front side. The outer edges of the conductive layer 17 are not covered with the polarizing plate 14. Three ground connectors 18 are disposed on the uncovered portion 21A of the array substrate 21 and coupled to the ground. The ground connectors 18 are separated from each other in the X-axis direction. Two of the ground connectors 18 are disposed adjacent to the short edges of the uncovered portion 21A, respectively. One of the ground connectors 18 is disposed at about the middle of the uncovered portion 21A between the short edges of the uncovered portion 21A. The ground connector 18 at about the middle is located between the first driver 12A and the second driver 12B with respect to the X-axis direction. The ground connectors 18 are located adjacent to the CF substrate 20 with respect to the Y-axis direction. Because the ground connectors 18 are coupled to the ground, the ground connectors 18 remain at a ground voltage. Conductors 19 are disposed to bridge the CF substrate 20 and the uncovered portion 21A. The conductors 19 are coupled to the conductive layer 17. Furthermore, the conductors 19 are coupled to the ground connectors 18, respectively. The conductors 19 are made of a conductive paste such as a silver paste. The conductive paste has flexibility in forming of shape. Therefore, the conductors 19 properly establish electrical connection between the conductive layer 17 and the ground connectors 18 although a step having a height corresponding to a thickness of the CF substrate 20 is present between the conductive layer 17 and the ground connectors 18. The conductors 19 provide high reliability in the electrical connection. The conductors 19 are positioned to correspond to the ground connectors 18, respectively. According to the configuration, even if the outer plate surface of the CF substrate 20 is electrically charged, the electrical charge can be released to the ground via the conductive layer 17, the conductors 19, and the connectors 18. According to the configuration, the outer surface of the CF substrate 20 is less likely to be charged and thus a problem in orientation of the liquid crystal molecules in the liquid crystal layer 22 is less likely to occur. Therefore, display failures are less likely to occur. Furthermore, the conductive layer 17 blocks unwanted radiation from the liquid crystal panel 11, which may affect external devices (e.g., an onboard radio if the liquid crystal display device 10 is installed in a vehicle).

As illustrated in FIG. 1, the uncovered portion 21A of the array substrate 21 includes a control mark CM for production control and alignment marks AM for alignment. The control mark CM is associated with a lot number or an identification number and registered to a production control system. The control mark CM is read by a reader in the production process to identify the array substrate 21 for the production control. The control mark CM is located at about the middle of the uncovered portion 21A with respect to the X-axis direction and adjacent to an edge of the ground connector 18 at about the middle (on an opposite side from the covered portion 21B) with respect to the Y-axis direction. The control mark CM is located to roughly match the ground connector 18 at about the middle and between the first driver 12A and the second driver 12B with respect to the X-axis direction. Examples of the control mark CM include letters other than the letters in FIG. 1, numbers, symbols, a barcode, a geometric pattern, and a test element group (TEG). The alignment marks AM are used for positioning of the array substrate 21 relative to a manufacturing apparatus. The alignment marks AM are located at corners of the uncovered portion 21A defined by the outer long edge and the short edges of the uncovered portion 21A, respectively. The alignment marks AM are located between the outer long edge of the uncovered portion 21A and the ground connectors 18 adjacent to the short edges of the uncovered portion 21A, respectively. The alignment marks AM are not limited to the symbols illustrated in FIG. 1.

The liquid crystal panel 11 has the display function to display images and the touch panel function to detect a position at which a user performs touch input based on a displayed image (an input position). The touch panel pattern is formed through the in-cell technology to perform the touch panel function. The touch panel pattern uses the projected capacitive technology and the self-capacitance sensing method. As illustrated in FIG. 1, the touch panel pattern includes touch electrodes 29 (position detecting electrodes) arranged in a matrix within a plate surface of the liquid crystal panel 11. The touch electrodes 29 are disposed in the display area AA of the liquid crystal panel 11. The display area AA of the liquid crystal panel 11 is about equal to a touch area in which input positions are detectable (a touch input area). The non-display area NAA is about equal to a non-touch area in which input positions are not detectable (a non-touch input area). When the user brings his/her finger (a position input member), which is a conductive member, closer to the display surface of the liquid crystal panel 11 to perform touch input based on an image displayed in the display area AA of the liquid crystal panel 11, the finger and the touch electrode 29 form a capacitor. A capacitance of the capacitor between the finger and the touch electrode 29 varies as the finger approaches the touch electrode 29. That is, the capacitance is different from a capacitance at the touch electrodes 29 that are farther from the finger. Therefore, a position of the touch input can be detected based on the capacitance that is different from the capacitance at other touch electrodes 29. This embodiment includes four touch electrodes 29 in each row and two touch electrodes 29 in each column and thus a total of eight touch electrodes 29. The number of the touch electrodes is not limited to eight. Each of the touch electrodes 29 has a rectangular shape in a plan view with each side in some millimeters (e.g., about 2 mm to 6 mm). Each of the touch electrodes 29 is significantly larger than each of pixels in a plan view to cover multiple pixels in the X-axis direction and the Y-axis direction.

Figure 3:
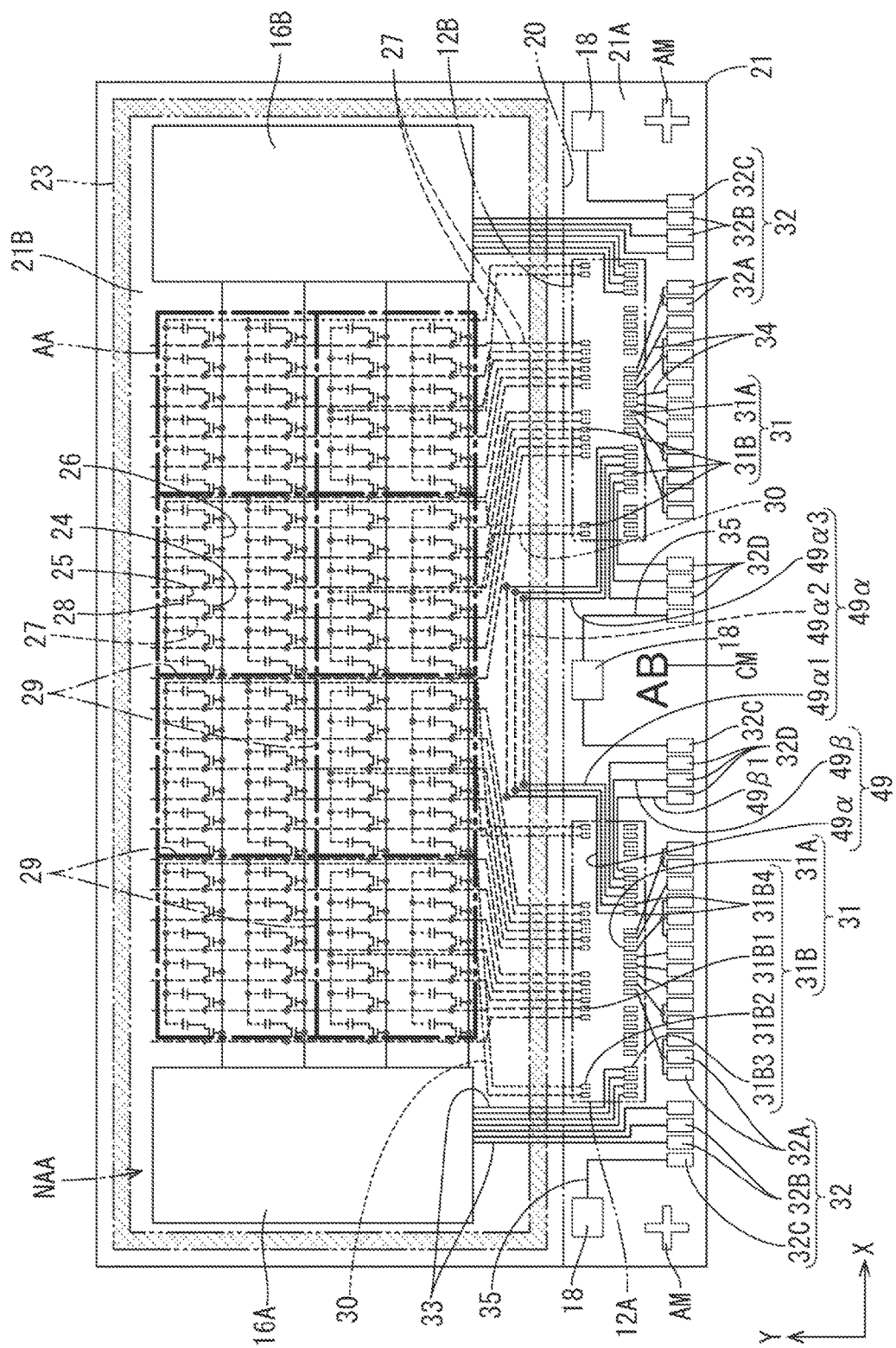
FIG. 3 is a plan view illustrating a circuit on an array substrate included in the liquid crystal panel.

As illustrated in FIG. 3, thin film transistors (TFTs) 24 and pixel electrodes 25 are disposed on an inner surface side of the array substrate 21 in the display area AA. The TFTs 24 and the pixel electrodes 25 are arranged at intervals in the X-axis direction and the Y-axis direction, that is, in a matrix. The TFTs 24 and the pixel electrodes 25 are disposed in areas defined by the gate lines 26 (scan lines) and the source lines 27 (image signal lines) that are perpendicular to each other. The gate lines 26 extend in the X-axis direction. The gate lines 26 include first end coupled to the first gate circuit 16A and second end coupled to the second gate circuit 16B. The source lines 27 includes first portions that extend in the Y-axis direction in the display area AA, second portions that extend from ends of the first portions and bend in crank shapes in the non-display area NAA, and third portions that extend from ends of the second portions in the Y-axis direction in the non-display area NAA. Middle sections of the second portions diagonally extend. The third portions of the source lines 27 extending through four of the touch electrodes 29 closer to the first gate circuit 16A extend to the first driver 12A. The third portions of the source lines 27 extending through four of the touch electrodes 29 closer to the second gate circuit 16B extend to the second driver 12B. Ends of the third sections are coupled to source line output terminals 31B1. The TFTs 24 include gate electrodes, source electrodes, drain electrodes, and channels. The gate electrodes are coupled to the gate lines 26. The source electrodes are coupled to the source lines 27. The drain electrodes are coupled to the pixel electrodes 25. The channels are coupled to the source electrodes and the drain electrodes. The channels are made of a semiconductor material (e.g., low temperature polycrystalline silicon). The TFTs 24 are driven based on the scan signals supplied to the gate lines 26. Voltages based on the image signals (data signals) supplied from the first driver 12A and the second driver 12B are applied to the drain electrodes via the channels. The pixel electrodes 25 are charged to the voltages based on the image signals. The pixel electrodes 25 are made of a transparent electrode material (e.g., ITO). The pixel electrodes 25 are disposed in the areas defined by the gate lines 26 and the source lines 27. Each of the pixel electrodes 25 has a rectangular shape in a plan view.

Figure 4:
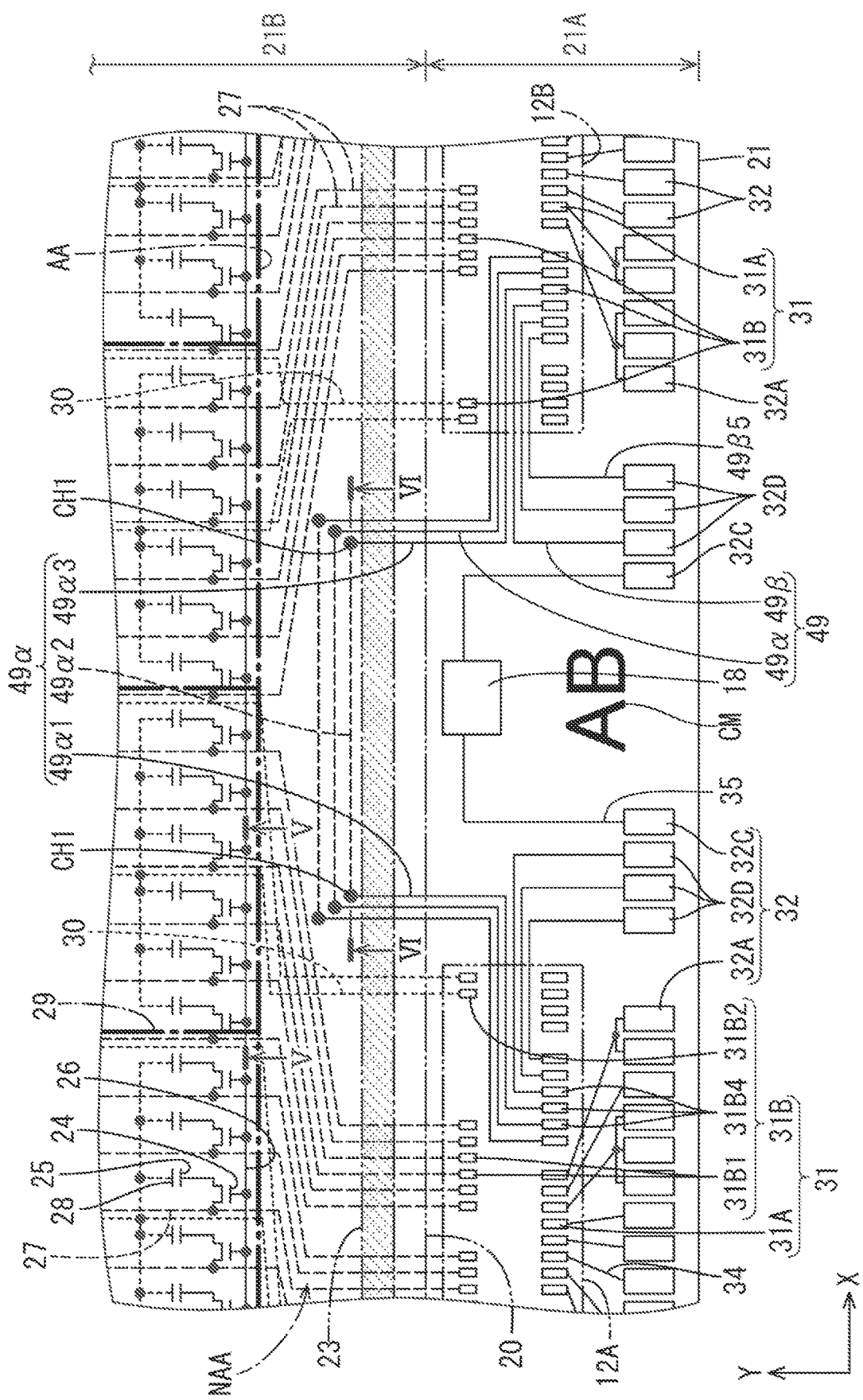
FIG. 4 is a plan view illustrating a portion of the liquid crystal panel.

As illustrated in FIGS. 3 and 4, a common electrode 28 is disposed on the inner surface side of the array substrate 21 in the display area AA to overlap all of the pixel electrodes 25. The common electrode 28 is in a layer upper than the pixel electrodes 25. The common electrode 28 covers about an entire area of the display area AA. Portions of the common electrode 28 overlapping the pixel electrodes 25 include slits that extend in a longitudinal direction of the pixel electrodes 25. Each portion includes multiple slits. When the pixel electrodes 25 are charged and voltage differences are present between the pixel electrodes 25 and the corresponding portions of the common electrode 28, fringe electric fields (orthogonal electric fields) including components along the plate surface of the array substrate 21 and component in a normal direction to the plate surface of the array substrate 21 are generated opening edges of the slits and the pixel electrodes 25. With the fringe electric fields, the orientation of the liquid crystal molecules in the liquid crystal layer 22 can be controlled. Namely, the liquid crystal panel 11 operates in fringe field switching (FFS) mode. The common electrode 28 includes the touch electrodes 29. The common electrode 28 includes dividing slits that separate the touch electrodes 29 from each other. With the dividing slits, the touch electrodes 29 of the common electrode 28 are electrically independent from each other.

As illustrated in FIGS. 3 and 4, the touch lines 30 (position detecting lines, common signal lines) are disposed on the inner surface side of the array substrate 21 in the display area AA. The touch lines 30 are electrically connected to selected ones of the touch electrodes 29. The touch lines 30 are physically connected to the touch electrodes 29, respectively. The number of the touch lines 30 is equal to the number of the touch electrodes 29, that is, eight. The touch lines 30 include first portions that extend in the Y-axis direction in the display area AA, second portions that extend from ends of the first portions and bend in crank shapes in the non-display area NAA, and third portions that extend from ends of the second portions in the Y-axis direction in the non-display area NAA. Middle sections of the second portions diagonally extend. The third portions of the touch lines 30 extending through four of the touch electrodes 29 closer to the first gate circuit 16A extend to the first driver 12A. The third portions of the touch lines 30 extending through four of the touch electrodes 29 closer to the second gate circuit 16B extend to the second driver 12B. Ends of the third sections are coupled to touch line output terminals 31B2. The touch lines 30 receive the common signals (reference voltage signals) regarding the display function and the touch signals (position detecting signals) regarding the touch function sent by the first driver 12A and the second driver 12B at different periods (with a time-dividing method). The periods during which the first driver 12A and the second driver 12B sent the common signals to the touch lines 30 are referred to as display periods. The periods during which the first driver 12A and the second driver 12B sent the touch signals to the touch lines 30 are referred to as sensing periods (position detecting periods). During the display periods, the common signals are supplied to the touch lines 30. Therefore, all of the touch electrodes 29 are held at the reference voltage and thus the touch electrodes 29 perform the function of the common electrode 28. The liquid crystal display device 10 having the above configuration is provided with not only the display function and the touch panel function but also high definition. Multiple drivers (the first driver 12A and the second driver 12B) are provided with high performance.

As illustrated in FIGS. 3 and 4, conductive lines and terminals for sending signals to the source lines 27, the first gate circuit 16A, and the second gate circuit 16B are disposed on the inner surface side of the uncovered portion 21A of the array substrate 21 in the non-display area NAA. Driver connecting terminals 31 are disposed in the first driver mounting area and the second driver mounting area of the uncovered portion 21A. The driver connecting terminals 31 are coupled to corresponding one of the first driver 12A and the second driver 12B. Flexible printed circuit (FPC) board connecting terminals 32 are disposed in a first FPC board mounting area and a second FPC mounting area of the uncovered portion 21A to which the first FPC board 13A and the second FPC board 13B are mounted. The FPC board connecting terminals 32 are coupled to corresponding one of the first FPC board 13A and the second FPC board 13B. The driver connecting terminals 31 include input terminals 31A to input signals to the first driver 12A or the second driver 12B and output terminals 31B to receive output signals from the first driver 12A or the second driver 12B. The input terminals 31A are arranged at intervals in the X-axis direction. The input terminals 31A are adjacent to the long edges of the first driver 12A and the second driver 12B adjacent to the FPC board connecting terminals 32. The output terminals 31B are arranged at intervals in the X-axis direction. For each one of the first driver 12A and the second driver 12B, a first group and a second of the output terminals 31B are located to sandwich the input terminals 31A and a third group of the output terminals 31B is located the other long edge of the first driver 12A or the second driver 12B adjacent to the display area AA. The input terminals 31A and the output terminals 31B are coupled to the terminals of the first driver 12A and the second driver 12B via anisotropic conductive films (ACFs).

As illustrated in FIGS. 3 and 4, the output terminals 31B include the source line output terminals 31B1, the touch line output terminals 31B2, gate circuit output terminals 31B3, and synchronization line output terminals 31B4 (synchronization line terminals). The source line output terminals 31B1 are coupled to the ends of the third portions of the source lines 27. The touch line output terminals 31B2 are coupled to the ends of the third portions of the touch lines 30. The gate circuit output terminals 31B3 are coupled to ends of second portions of the gate circuit lines 33, which will be described later. The synchronization line output terminals 31B4 are coupled to synchronization lines 49, which will be described later. The gate circuit lines 33 include first portions that extend to cross a border between the covered portion 21B and the uncovered portion 21A. The gate circuit lines 33 include first ends located in the covered portion 21B and second ends located in the uncovered portion 21A. Some of the first ends are coupled to the first gate circuit 16A and the rest is coupled to the second gate circuit 16B. The second ends of the gate circuit lines 33 are coupled to the gate circuit output terminals 31B3. The source line output terminals 31B1 receive the image signals from the first driver 12A and the second driver 12B. The touch line output terminals 31B2 receive the common signals and the touch signals from the first driver 12A and the second driver 12B using the time-dividing method. The gate circuit output terminals 31B3 receive control signals including clock signals and initialization signals from the first driver 12A and the second driver 12B. The synchronization line output terminals 31B4 receive the synchronization signals from the first driver 12A and the second driver 12B. The source line output terminals 31B1 and the touch line output terminals 31B2 are separated from the input terminals 31A in the Y-axis direction and closer to the display area AA relative to the input terminals 31A within the first driver mounting area and the second driver mounting area. The source line output terminals 31B1 are disposed in the middle with respect to the X-axis direction. Groups of the touch line output terminals 31B2 are disposed to sandwich each group of the source line output terminals 31B1. Groups of the gate circuit output terminals 31B3 and the synchronization line output terminals 31B4 are disposed to sandwich each group of the input terminals 31A in the X-axis direction within each of the first driver area and the second driver mounting area. The gate circuit output terminals 31B3 are closer to the short edges of the array substrate 21. The synchronization line output terminals 31B4 are closer to the middle of the array substrate between the short edges of the array substrate 21. For production of different types of liquid crystal panels, the configurations of the first driver 12A and the second driver 12B may be altered while the configuration of the array substrate 21 may not be altered. If the configurations of the first driver 12A and the second driver 12B are altered, some of the output terminals 31B may not be used and defined as dummy terminals.

As illustrated in FIGS. 3 and 4, the FPC board connecting terminals 32 include driver terminals 32A, gate circuit terminals 32B, ground terminals 32C, and synchronization line terminals 32D. The driver terminals 32A are coupled to connecting lines 34, which will be described later. The gate circuit terminals 32B are coupled to the second portions of some of the gate circuit lines 33. The ground terminals 32C are coupled to ends of ground lines 35, which will be described later. The synchronization line terminals 32D are coupled to second synchronization lines 4913, which will be described later. The connecting lines 34 extend to cross a border between corresponding one of the first driver 12A and the second driver 12B and corresponding one of the first FPC board 13A and the second FPC board 13B. The connecting lines 34 include first ends coupled to the input terminals 31A and second ends coupled to the driver terminals 32A. The ground lines 35 are disposed in the uncovered portion 21A. The ground lines 35 include first ends located closer to the covered portion 21B and coupled to the ground connectors 18 and second ends coupled to the ground terminals 32C. The driver terminals 32A receive signals for driving the first driver 12A and the second driver 12B through the first FPC board 13A and the second FPC board 13B. The gate circuit terminals 32B receive power supply voltages through the first FPC board 13A and the second FPC board 13B. The ground terminals 32C receive the ground voltage through the first FPC board 13A and the second FPC board 13B. The synchronization line terminals 32D receive the synchronization signals through the second synchronization lines 4913. The driver terminals 32A are arranged at intervals in the X-axis direction in the first FPC board mounting area and the second FPC board mounting area. The gate circuit terminals 32B are disposed closer to the short edges of the array substrate 21 relative to the corresponding driver terminals 32A in the X-axis direction within the first FPC board mounting area and the second FPC board mounting area. The ground terminals 32C are disposed at ends of the first FPC board mounting area and the second FPC board mounting area with respect to the X-axis direction. The synchronization line terminals 32D are disposed in the first FPC board mounting area and the second FPC board mounting area adjacent to the middle of the array substrate 21 with respect to the X-axis direction.

Films formed on the glass substrate of the array substrate 21 will be described in detail with reference to FIG. 5. On the glass substrate of the array substrate 21, a basecoat film 36, a semiconductor film, a gate insulator film 37, a first metal film 38 (a conductive film, a gate metal film), a first interlayer insulator film 39, (an insulator film), a second metal film 40 (a conductive film, a source metal film), a planarization film 41 (an insulator film), a third metal film 42 (a conductive film), a first transparent electrode film 43, a second interlayer insulator film 44, a second transparent electrode film 45, and an alignment film are formed in layers in this sequence from a lower side (a glass substrate side). The first metal film 38 is in the lowest layer among the metal films 38, 40 and 42. Etching will be repeatedly performed after the first metal film 38 is formed and patterned. Therefore, the first metal film 38 is made of a material having a high melting point so that the first metal film 38 is less likely to have corrosion from the etching. The first metal film 38 may be a single-layer film, a multilayer film, or an alloy of tantalum (Ta) or molybdenum (Mo). The gate lines 26 and the gate electrodes of the TFTs 24 are formed from the first metal film 38 (see FIGS. 3 and 4). The second metal film 40 and the third metal film 42 are disposed in upper layers than the first metal film 38. The number of times that the etching is performed after the second metal film 40 and the third metal film 42 are formed and patterned is less than the number of times that the etching is performed after the first metal film 38 is formed and patterned. Therefore, the second metal film 40 and the third metal film 42 are made of materials having resistances less than a resistance of the material of the first metal film 38. The second metal film 40 and the third metal film 42 may be a single-layer film of aluminum (Al), a multilayer film including aluminum, or an alloy including aluminum. The source lines 27 and the source electrodes and the drain electrodes of the TFTs 24 are formed from the second metal film 40. The touch lines 30 are formed from the third metal film 42. The touch lines 30 are disposed to overlap the source lines 27 via the planarization film 41. In FIGS. 3 and 4, different types of lines are used for the conductive lines according to the metal films from which the conductive lines are formed. Specifically, the conductive lines formed from the first metal film 38 are illustrated with solid lines, the conductive lines formed from the second metal film 40 are illustrated with long broken lines, and the conductive lines formed from the third metal film 42 are illustrated with short broken lines.

The semiconductor film is a continuous grain (CG) silicone thin film, which is one kind of polysilicon thin films. The CG silicon thin film is formed by adding a metal material to an amorphous silicon thin film and perform a low temperature heat processing on the thin film at about a temperature of 550° C. or lower. The CG silicon thin film has continuous atomic arrangement at crystal grain boundaries in silicon crystals. The channels of the TFTs 24 are formed from the semiconductor film. The semiconductor film is disposed in a layer lower than the first metal film 38 with the gate insulator film 37 therebetween. The TFTs 24 are top-gate type TFTs including gate electrodes disposed in a layer upper than the channels. The basecoat film 36, the gate insulator film 37, the first interlayer insulator film 39, and the second interlayer insulator film 44 are made of inorganic materials such as silicon nitride ($SiN_x$) and silicon oxide ($SiO_2$). The gate insulator film 37 is disposed between the gate electrodes and the channels of the TFTs 24 to insulate them from each other. The first interlayer insulator film 39 is disposed between the gate lines 26 and the source lines 27 to insulate them from each other. The second interlayer insulator film 44 is disposed between the common electrode 28 (the touch electrodes 29) and the touch lines 30 and the pixel electrodes 25 to insulate them from each other. The planarization film 41 is made of an organic material such PMMA (acrylic resin). The planarization film 41 is disposed between the source lines 27 and the touch lines 30 to insulate them from each other. The first transparent electrode film 43 and the second transparent electrode film 45 are made of a transparent electrode material (e.g., indium tin oxide (ITO)) or indium zinc oxide (IZO). The pixel electrodes 25 are formed from the first transparent electrode film 43. The first transparent electrode film 43 is in the same layer as the third metal film 42. The common electrode 28 (the touch electrodes) is formed from the second transparent electrode film 45.

Figure 5:
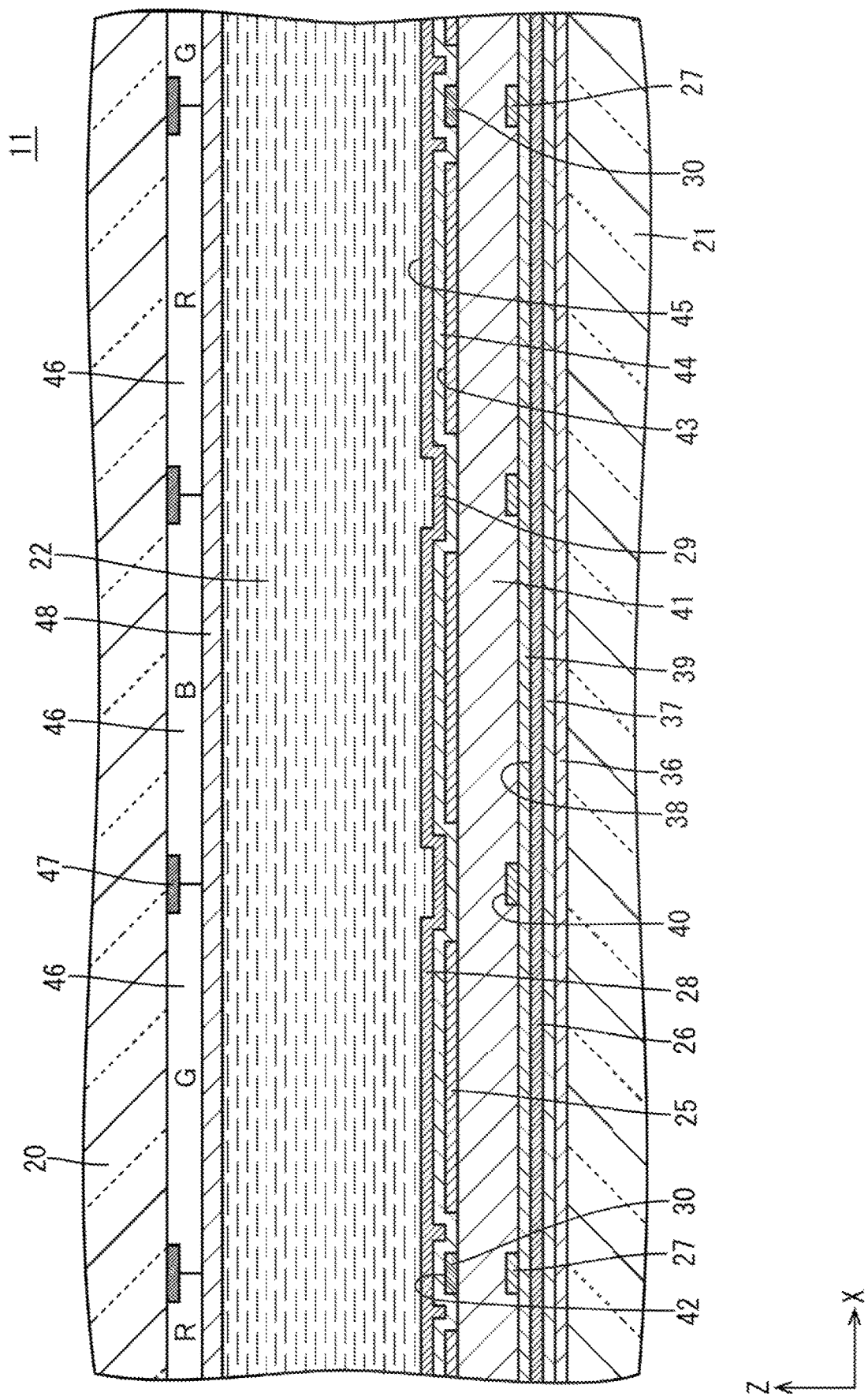
FIG. 5 is a cross-sectional view of the liquid crystal panel along line V-V in FIG. 4.

As illustrated in FIG. 5, the CF substrate 20 includes color filters 46 and a light blocking portion 47 (a black matrix) in the display area AA. The color filters 46 are disposed to exhibit blue (B), green (G), and red (R). The color filters 46 that exhibit different colors are repeatedly arranged in the X-axis direction along the source lines 27. According to the arrangement, the color filters 46 form a stripe pattern. The color filters 46 overlap the pixel electrodes 25 on the array substrate 21 in a plan view. The light blocking portion 47 separates the adjacent color filters 46 from each other in the X-axis direction to define color borders. The light blocking portion 47 includes sections that extend along the color filters 46 and the source lines 27. In the liquid crystal panel 11, the R, the G, and the B color filters 46 arranged in the X-axis direction and three pixel electrodes 25 opposed to the R, the G, and the B color filters 46 form three colors of pixels. An overcoat film 48 is disposed over the color filters 46. An alignment film is disposed over the overcoat film 48.

The synchronization lines 49 included in the array substrate 21 will be described. As illustrated in FIG. 1, the synchronization lines 49 connect the first driver 12A to the second driver 12B. The synchronization lines 49 are coupled to the synchronization line output terminals 31B4 in the first driver mounting area and the second driver mounting area. The number of the synchronization lines 49 is defined based on the configurations of the first driver 12A and the second driver 12B. The number may be increased as the performance of the first driver 12A and the second driver 12B is enhanced. Enhancement in performance of the first driver 12A and the second driver 12B includes an increase in signal processing speed as the number of pixel electrodes and the number of the source lines increase or for a touch panel function. In this embodiment, the number of the synchronization lines 49 is increased for the enhancement in performance of the first driver 12A and the second driver 12B. Furthermore, the ground connectors 18 and the control mark CM are provided in the area between the first driver 12A and the second driver 12B. According to the configuration, the array substrate 21 does not have sufficient space for the synchronization lines 49.

As illustrated in FIG. 1, the synchronization lines include three first synchronization lines 49α (inner synchronization lines) and three second synchronization lines 4913 (outer synchronization lines). The first synchronization lines 49α are disposed within the array substrate 21. The first synchronization lines 49α extend to cross the border between the covered portion 21B and the uncovered portion 21A. Because portions of the first synchronization lines 49α are disposed in the covered portion 21B, an area of the uncovered portion 21A for the first synchronization lines 49α can be reduced. This configuration is effective when an area between the first driver 12A and the second driver 12B cannot be used for the synchronization lines 49. This configuration is especially effective when the number of the synchronization lines 49 is increased according to enhancement in performance of the first driver 12A and the second driver 12B. Furthermore, the uncovered portion 21A can be reduced in size, which is effective for reduction in frame width of the liquid crystal display device 10 and advantageous in design of the liquid crystal display device 10. The portions of the first synchronization lines 49α disposed in the covered portion 21B is covered with the CF substrate 20. Therefore, the portion of the first synchronization lines 49α is protected from corrosion or damages. The first synchronization lines 49α will be described in detail later.

As illustrated in FIG. 1, the second synchronization lines 4913 extend from the array substrate 21 to the PCB 15 via the first FPC board 13A and the second FPC board 13B. In comparison to a configuration in which the synchronization lines 49 are disposed only within the array substrate 21, an area of the covered portion 21B for the synchronization lines 49 can be reduced. Furthermore, in comparison to a configuration in which the synchronization lines 49 are disposed only in the uncovered portion 21A, areas of the first FPC board 13A and the second FPC board 13B for the synchronization lines 49 can be reduced. The configuration of synchronization lines 49 in this embodiment is preferable for a display panel including an increased number of synchronization lines.

As illustrated in FIG. 1, the second synchronization lines 49β include first portions 49β1, second portions 49β2, third portions 49β3, fourth portions 49β4, and fifth portions 49β5. The first portions 49β1 and the fifth portions 49β5 are disposed in the uncovered portion 21A of the array substrate 21. The second portions 49β2 are disposed on the first FPC board 13A and the fourth portions 49β4 are disposed on the second FPC board 13B. The third portions 49β3 are disposed on the PCB 15. The second portions 49β2 are coupled to the third portions 49β3 at a connecting portion between the first FPC board 13A and the PCB 15. The fourth portions 49β4 coupled to the third portions 49β3 at a connecting portion between the second FPC board 13B and the PCB 15. As illustrated in FIGS. 3 and 4, the first portions 49β1 and the fifth portions 49β5 include first ends coupled to the synchronization line output terminals 31B4 and second ends coupled to the synchronization line terminals 32D. The first portions 49β1 extend to cross one of the short edges of the first driver mounting area. The fifth portions 49β5 extend to cross one of the short edges of the second driver mounting area opposed to the one of the short edges of the first driver mounting area. The first portions 49β1 and the fifth portions 49β5 are formed from the first metal film 38. The first portions 49β1 are coupled to the second portions 49β2 via the synchronization line terminals 32D. The fifth portions 49β5 are coupled to the fourth portions 49β4 via the synchronization line terminals 32D. The synchronization signals (image synchronization signals) output from the first driver 12A are transmitted to the second portions 49β2 via the synchronization line output terminals 31B4 coupled to the first portions 49β1, the first portions 49β1, and the synchronization line terminals 32D coupled to the first portions 49β1. The synchronization signals are transmitted from the second portions 49β2 to the fourth portions 49β4 via the third portions 49β3 and then to the second driver 12B via the synchronization line terminals 32D connect to the fifth portions 49β5, the fifth portions 49β5, and the synchronization line output terminals 31B4 coupled to the fifth portions 49β5. The second synchronization lines 4913 extend from the uncovered portion 21A to the PCB 15 via the first FPC board 13A and the second FPC board 13B. In comparison to a configuration in which only one FPC board is provided and the second synchronization lines do not extend to cross the PCB 15, the first FPC board 13A and the second FPC board 13B can be more flexibly designed. In this embodiment, three second synchronization lines 49β are parallel to each other and transmit the image synchronization signals regarding output timing of the image signals.

Figure 6:
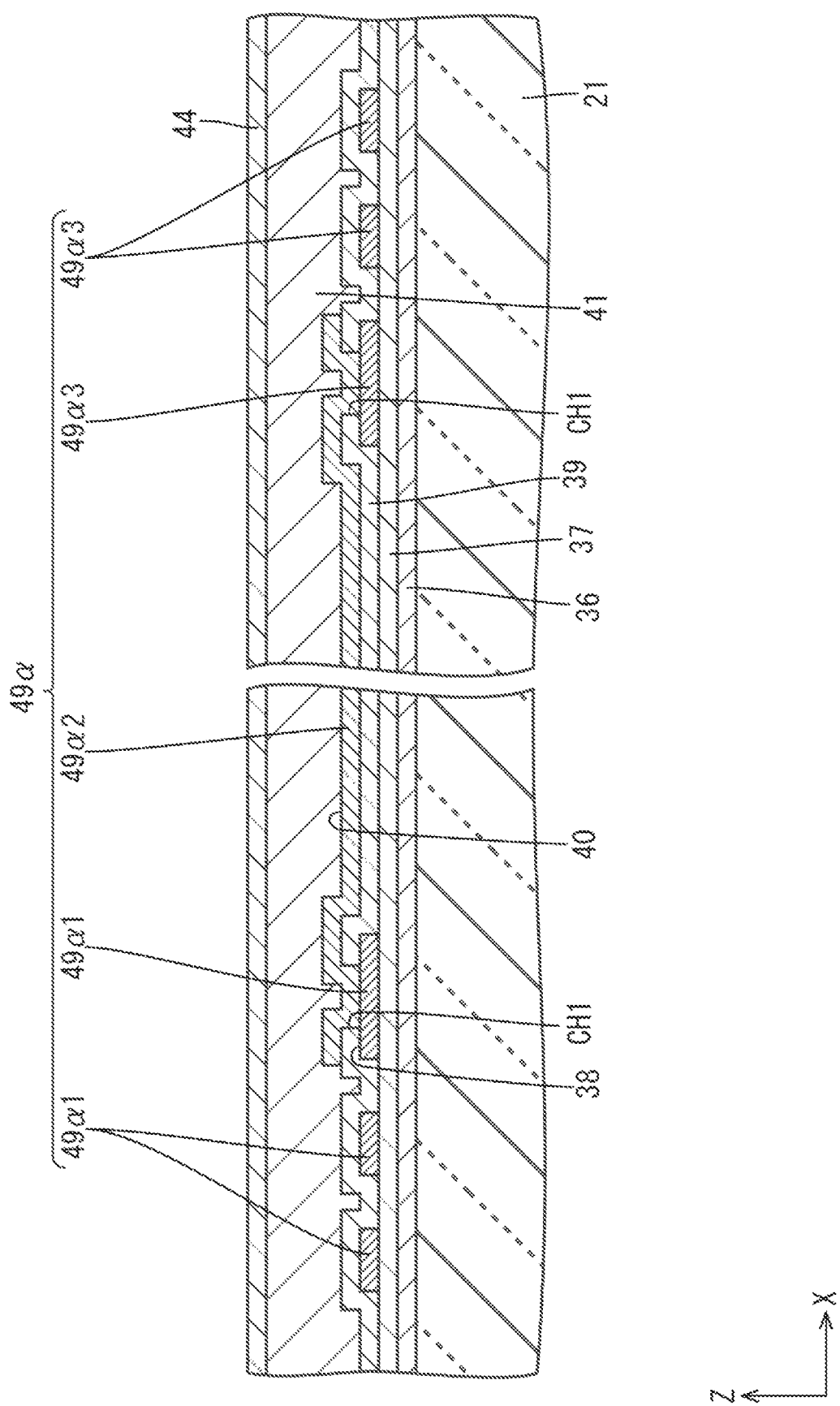
FIG. 6 is a cross-sectional view of a portion of the liquid crystal panel alone line VI-VI in FIG. 4.

The first synchronization lines 49α will be described in detail. As illustrated in FIGS. 3 and 4, the first synchronization lines 49α include first portions 49α1, second portions 49α2, and third portions 49α3. The first portions 49α1 and the third portions 49α3 are disposed in the uncovered portion 21A and the covered portion 21B of the array substrate 21 to cross the border between the covered portion 21B. The second portions 49α2 are disposed in the covered portion 21B. The first portions 49α1 include ends that are coupled to the synchronization line output terminals 31B4 in the first driver mounting area. Sections of the first portions 49α1 disposed in the uncovered portion 21A extend parallel to the first portions 49β1 and the second portions 49β2 of the second synchronization lines 49β. The first portions 49α1 cross the short edge of the first driver mounting area. Sections of the third portions 49α3 disposed in the uncovered portion 21A extend parallel to the fourth portions 49β4 and the fifth portions 49β5 of the second synchronization lines 49β. The third portions 49α3 cross the short edge of the second driver mounting area. The first portions 49α1 and the third portions 49α3 are formed from the first metal film 38. Sections of the first portions 49α1 and the third portions 49α3 extend in the Y-axis direction to cross the sealant 23. The sealant 23 is disposed to surround the display area AA. The sealant 23 includes a section disposed between the display area AA and the first driver 12A and the second driver 12B. The section of the sealant 23 extends in the X-axis direction. That is, the sections of the first portions 49α1 and the third portions 49α3 extend in the Y-axis direction are perpendicular to the second of the sealant 23 extending in the X-axis direction. The second portions 49α2 are disposed farther from the border between the uncovered portion 21A and the covered portion 21B relative to the section of the sealant 23 and separated from the section of the sealant 23. The second portions 49α2 extend in the X-axis direction, that is, parallel to the section of the sealant 23. The second portions 49α2 are formed from the second metal film 40 having the resistance lower than the resistance of the first metal film 38 from which the first portions 49α1 and the third portions 49α3 are formed. As illustrated in FIGS. 4 and 6, ends of the second portions 49α2 are opposed to ends of the first portions 49α1 and the third portions 49α3 in the covered portion 21B. The ends of the second portions 49α2 coupled to the ends of the first portions 49α1 and the third portions 49α3 via first contact holes CH1 formed in the first interlayer insulator film 39. In FIG. 4, the first contact holes CH1 are indicated by larger black dots.

In comparison to a configuration in which the second portions 49α2 are formed from the first metal film 38, the configurations of the first synchronization lines 49α are more preferable for reduction in resistance of the first synchronization lines 49α. The second portions 49α2 are formed from the second metal film 40 that is in the layer upper than the first metal film 38. In comparison to the first metal film 38, the second metal film 40 is more likely to be subject to corrosion. Because the second portions 49α2 are disposed in the covered portion 21B and covered with the CF substrate 20, the second portions 49α2 are less likely to be subject to corrosion or damages. The first portions 49α1 and the third portions 49α3 extend to cross the border between the uncovered portion 21A and the covered portion 21B. The second portions 49α2 extend parallel to the section of the sealant 23. In comparison to a configuration in which sections of the first portions 49α1 and the third portions 49α3 extend parallel to the section of the sealant 23, overlapping areas of the first portions 49α1 and the third portions 49α3 with the section of the sealant 23 can be reduced. Therefore, the ultraviolet rays applied to the ultraviolet curable resin included in the sealant 23 are less likely to be blocked by the first synchronization lines 49α and thus a failure is less likely to occur in formation of the sealant 23.

As illustrated in FIG. 4, the first synchronization lines 49α are parallel to each other and transmit the time-dividing synchronization signals regarding output timing of the touch signals and the reference voltage signals. The time-dividing synchronization signals output by the first driver 12A are transmitted to the second driver 12B via the synchronization line output terminals 31B4 in the first driver mounting area, the first portions 49α1, the second portions 49α2, the third portions 49α3, and the synchronization line output terminals 31B4 in the second driver mounting area.

The first synchronization lines 49α transmit the time-dividing synchronization signals and the second synchronization lines 4913 transmit the image synchronization signals. According to the configuration, the time-dividing synchronization signals transmitted by the respective first synchronization lines 49α are equalized and the image synchronization signals transmitted by the respective second synchronization lines 49β are equalized. This configuration is preferable for stable operation of the liquid crystal display device 10.

As described above, the liquid crystal display device 10 includes the CF substrate 20, the array substrate 21, the source lines 27, the first driver 12A, the second driver 12B, the synchronization line output terminals 31B4, and the synchronization lines 49 each having the configurations described above.

As described earlier, the liquid crystal panel 11 includes the conductive layer 17, the ground connectors 18, and the conductors 19 each having the configurations described earlier. To dispose one of the ground connectors 18 between the first driver 12A and the second driver 12B, sufficient space may not be provided if all portions of the synchronization lines 49 are disposed in the uncovered portion 21A of the array substrate 21. Because the second portions 49α2 of the first synchronization lines 49α are disposed in the covered portion 21B of the array substrate 21. Therefore, sufficient space is provided for the ground connector 18.

The liquid crystal panel 11 includes the control mark CM between the first driver 12A and the second driver 12B in the uncovered portion 21A. To dispose one of the control mark CM between the first driver 12A and the second driver 12B, sufficient space may not be provided if all portions of the synchronization lines 49 are disposed in the uncovered portion 21A. Because the second portions 49α2 of the first synchronization lines 49α are disposed in the covered portion 21B of the array substrate 21. Therefore, sufficient space is provided for the control mark CM.

Second Embodiment

A second embodiment will be described with reference to FIGS. 7 and 8. A liquid crystal panel 111 according to the second embodiment includes synchronization lines 149 that include first synchronization lines 149α and the second synchronization lines 49β. The first synchronization lines 149α have configurations different from the configurations of the first synchronization lines 49α in the first embodiment. Configuration, functions, operation, and effects similar to those of the first embodiment will not be described.

Figure 7:
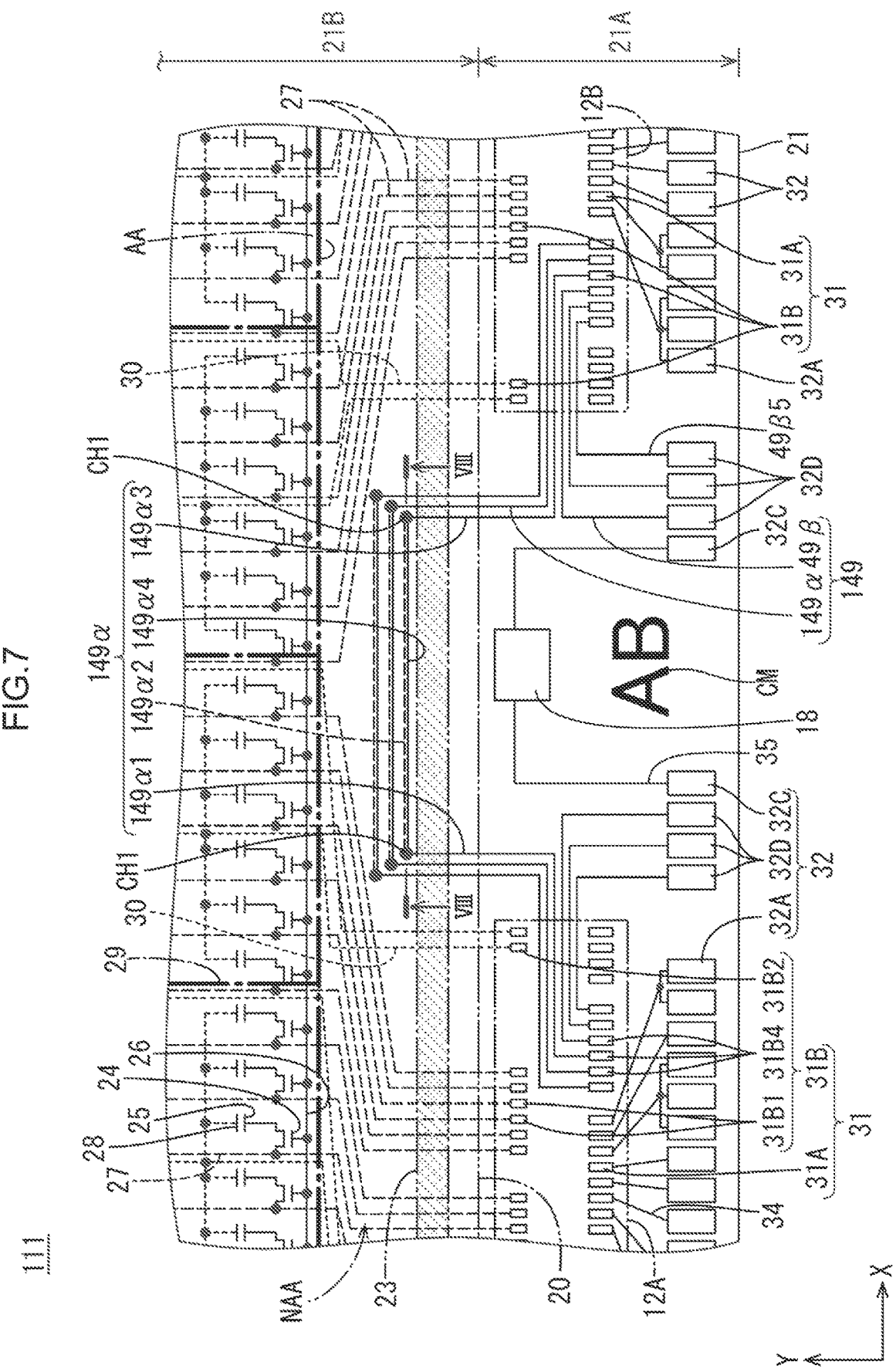
FIG. 7 is a plan view of a portion of a liquid crystal panel.
Figure 8:
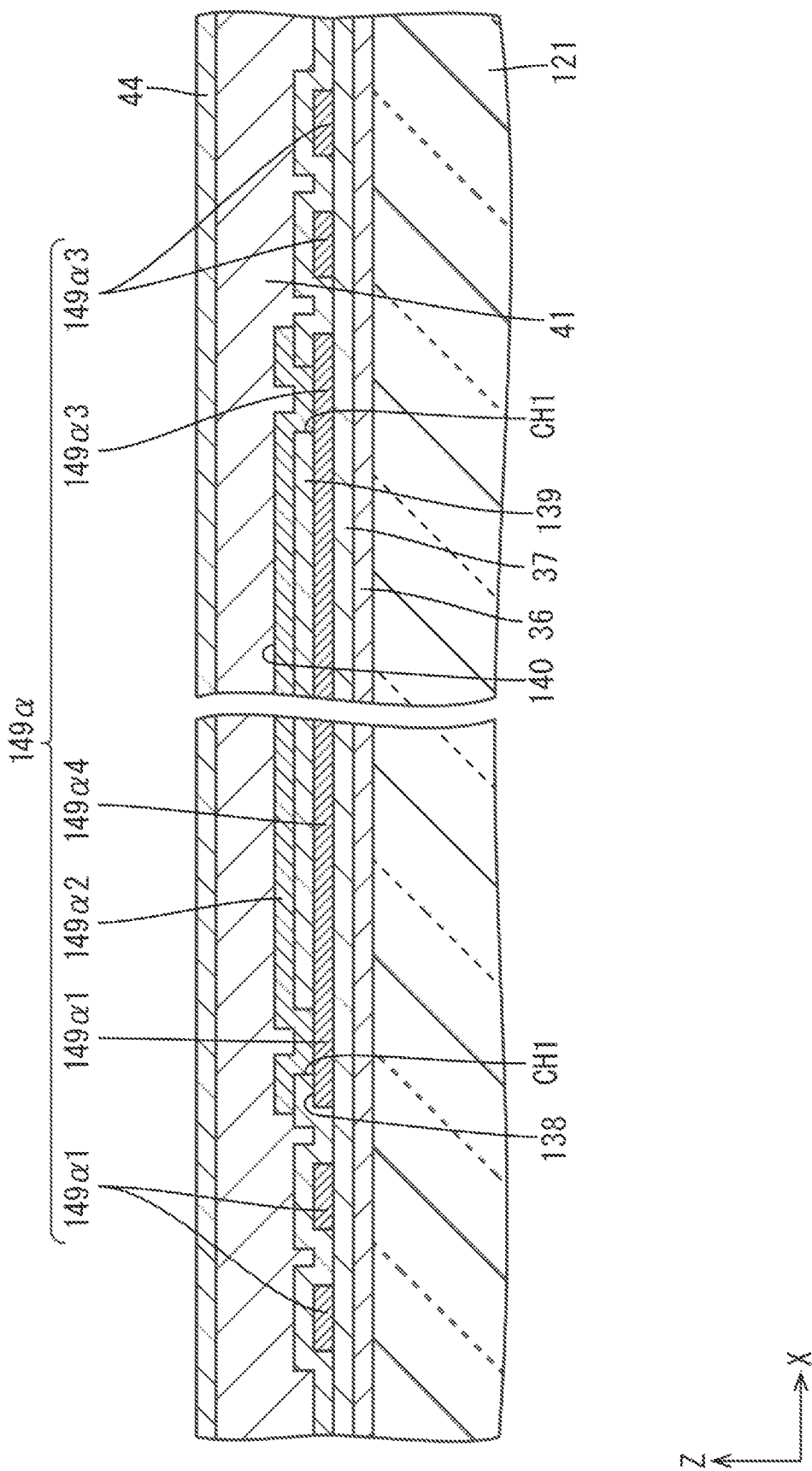
FIG. 8 is a cross-sectional view of a portion of the liquid crystal panel along line VIII-VIII in FIG. 7.

As illustrated in FIGS. 7 and 8, the first synchronization lines 149α include first portions 149α1, second portions 149α2, third portions 149α3, and auxiliary portions 149α4. The first portion 149α1, the second portions 149α2, and the third portions 149α3 have configurations similar to the configurations of the first portions 49α1, the second portions 49α2, and the third portions 49α3 in the first embodiment, respectively. The first portion 149α1, the third portions 149α3, and the auxiliary portions 149α4 are formed form a first metal film 138. The auxiliary portions 149α4 linearly extend parallel to the second portions 149α2. The auxiliary portions 149α4 are opposed to the second portions 149α2 with a first interlayer insulator film 139 between the auxiliary portions 149α4 and the second portions 149α2. According to the configurations, time-dividing synchronization signals output by the first driver 12A to the third portions 149α3 via the first portions 149α1, the second portions 149α2, and the auxiliary portions 149α4. Resistance of the first synchronization lines 149α are further reduced and the first synchronization lines 149α are provided with redundancy. The auxiliary portions 149α4 are opposed to the second portions 149α2. In comparison to a configuration in which the auxiliary portions 149α4 are not opposed to the second portions 149α2, areas of the uncovered portion 21A for the first synchronization lines 149α are reduced.

The second portions 149α2 are formed form a second metal film 140 having a resistance lower than the resistance of the first metal film 138. Therefore, the resistances of the first synchronization lines 149α are further reduced. Furthermore, because the auxiliary portions 149α4 formed from the first metal film 138 are provided in addition to the second portions 149α2, the first synchronization lines 149α are provided with redundancy.

Third Embodiment

A third embodiment will be described with reference to FIGS. 9 and 10. A liquid crystal panel 211 according to the third embodiment includes synchronization lines 249 and three dummy lines 50. The synchronization lines 249 include first synchronization lines 249α and the second synchronization lines 49β. The first synchronization lines 249α have configurations different from the configurations of the first synchronization lines 49α in the first embodiment. Configurations, functions, operation, and effects similar to those of the first embodiment will not be described.

The first synchronization lines 249α include first portions 249α1, second portions 249α2, and third portions 249α3. The first portions 249α1 and the third portions 249α3 have configurations similar to the configurations of the first portions 49α1 and the third portions 49α3 in the first embodiment. The second portions 249α2 include first sections 51, second sections 52, and third sections 53. The first sections 51, the third sections 53, and the dummy lines 50 are formed from a second metal film 240. The second sections 52 are formed from a third metal film 242. The first sections 51 extend from ends of the first portions 249α1 in the X-axis direction. The third sections 53 extend from ends of the third portions 249α3 in the X-axis direction. The first sections 51 and the third sections are coupled to the ends of the first portions 249α1 and the third portions 249α3 via the first contact holes CH1, respectively. The second sections 52 extend from ends of the first sections 51 to ends of the third sections in the X-axis direction. Ends of the second sections 52 are coupled to the ends of the first sections 51 and the third sections 53 via second contact holes CH2 formed in a planarization film 241. In FIG. 9, the second contact holes CH2 are indicated by black dots in the same size as the black dots that indicate the first contact holes CH1.

Figure 9:
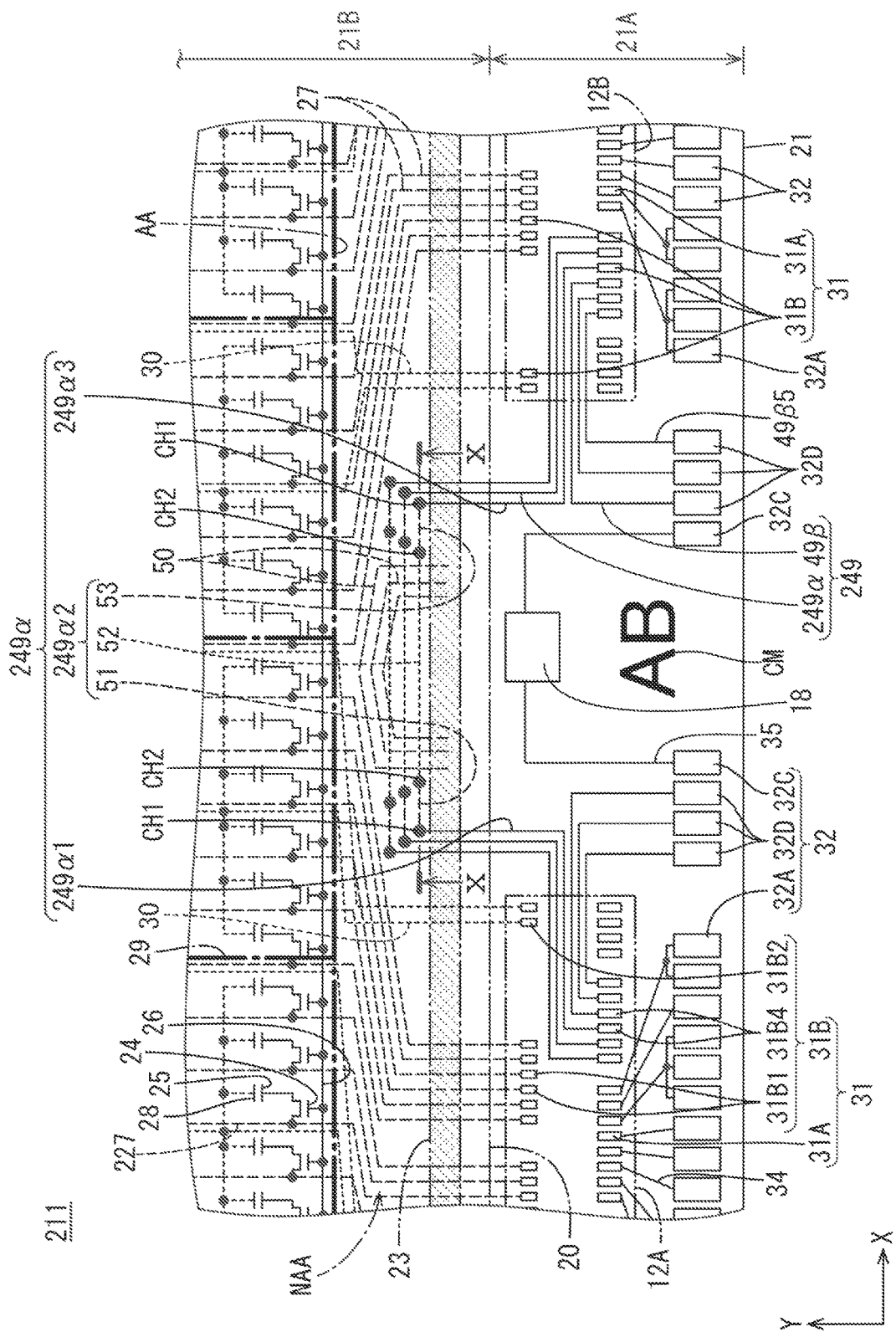
FIG. 9 is a plan view of a portion of a liquid crystal panel.
Figure 10:
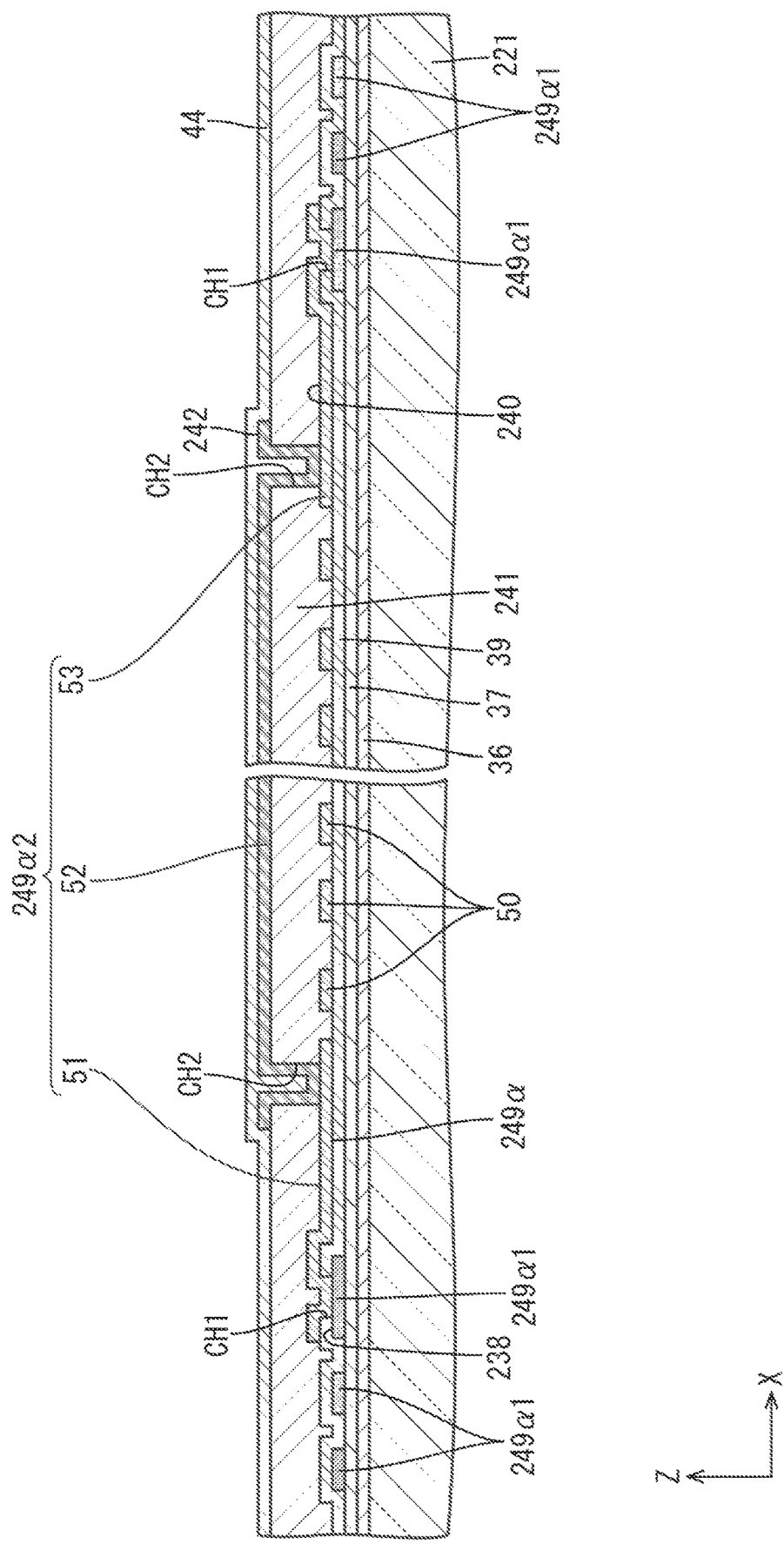
FIG. 10 is a cross-sectional view of a portion of the liquid crystal panel along line X-X in FIG. 9.

As illustrated in FIG. 9, the dummy lines 50 are disposed in the covered portion 21B of the array substrate 21. The dummy lines 50 are not coupled to the source lines 27, the first driver 12A, the second driver 12B, and synchronization lines 249. The dummy lines 50 are disposed in an area of the covered portion 21B in which the source lines 27 are not disposed. The dummy lines 50 extend along the source lines 27. The dummy lines 50 are formed from the second metal film 240. The dummy lines 50 are disposed between a group of the source lines 27 coupled to the first driver 12A and a group of the source lines 27 coupled to the second driver 12B. The dummy lines 50 are located at about the middle between the groups of the source lines 27 with respect to the X-axis direction. The dummy lines include first vertical portions that extend in the Y-axis direction and orthogonal portions that extend orthogonal to the Y-axis direction. Ends of the vertical portions are opposed to the sealant 23. The dummy lines 50 are parallel to each other. With the dummy lines 50, a gap between the groups of the source lines 27 can be reduced. Furthermore, the dummy lines 50 may be coupled to an electrostatic protection circuit to increase resistance to electrostatic discharge.

The first sections 51 and the third sections 53 of the second portions 249α2 of the first synchronization lines 249α do not cross the dummy lines 50. The planarization film 241 is disposed between the dummy lines 50 and the second sections 52. Therefore, the second sections 52 are not electrically connected to the dummy lines 50. Time-dividing synchronization signals output by the first driver 12A are transmitted to the second driver 12B via the first portions 249α1, the first sections 51, the second sections 52 and the third sections 53 of the second portions 249α2, and the third portions 249α3.

Fourth Embodiment

A fourth embodiment will be described with reference to FIG. 11. A liquid crystal panel 311 according to the fourth embodiment includes synchronization lines 349. The synchronization lines 349 include first synchronization lines 349α and the second synchronization lines 49β. The first synchronization lines 349α have configurations different from the configurations of the first synchronization lines 49α in the first embodiment. Configurations, functions, operation, and effects similar to those of the first embodiment will not be described.

Figure 11:
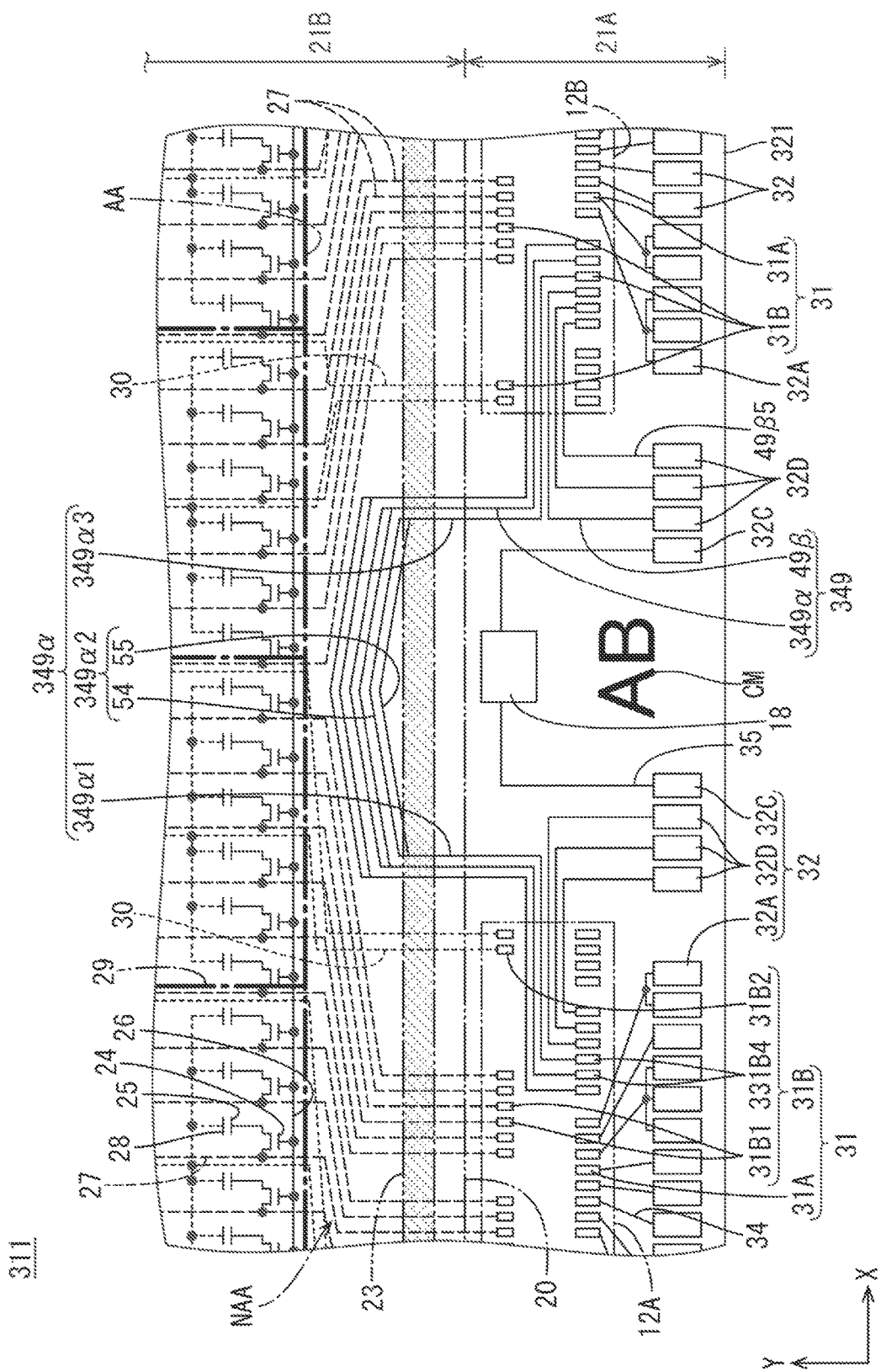
FIG. 11 is a plan view of a portion of a liquid crystal panel.

As illustrated in FIG. 11, the first synchronization lines 349α include first portions 349α1, second portions 349α2, and third portions 349α3. The first portions 349α1, the second portions 349α2, and the third portions 349α3 are formed from the first metal film. The first portions 349α1 and the third portions 349α3 have configurations similar to the configurations of the first portions 49α1 and the third portions 49α3 in the first embodiment. The second portions 349α2 of the first synchronization lines 349α are disposed in the covered portion 21B of the array substrate 21. The second portions 349α2 extend from ends of the first portions 349α1 to ends of the third portions 349α3. Ends of the second portions 349α2 are directly coupled to the ends of the first portions 349α1 and the third portions 349α3. Namely, each of the first synchronization lines 349α have a single-layer structure. Each of the first synchronization lines 49α, 149α and 249α has a multilayer structure. In comparison to the first to the third embodiments, the configurations of the first synchronization lines 349α are simpler because contact holes are not required.

The second portions 349α2 include first sections 54 and second sections 55. The first sections 54 and the second sections 55 are parallel to each other. Each of the first sections 54 and the second sections 55 has a V shape in a plan view. The first sections 54 and the second sections 55 extend along orthogonal portions of the source lines 27. Ends of the first sections 54 and the second sections 55 are coupled to the first portions 349α1 and the third portions 349α3. According to the configurations, resistances of the first synchronization lines 349α are reduced and the first synchronization lines 349α are provided with redundancy.

Fifth Embodiment

A fifth embodiment will be described with reference to FIG. 12. A liquid crystal panel 411 according to the fifth embodiment includes an array substrate 421 having a configuration different from the configuration of the array substrate and synchronization lines 449 having configurations different from the configurations of the synchronization lines 49 in the first embodiment. Configurations, functions, operation, and effects similar to those of the first embodiment will not be described.

Figure 12:
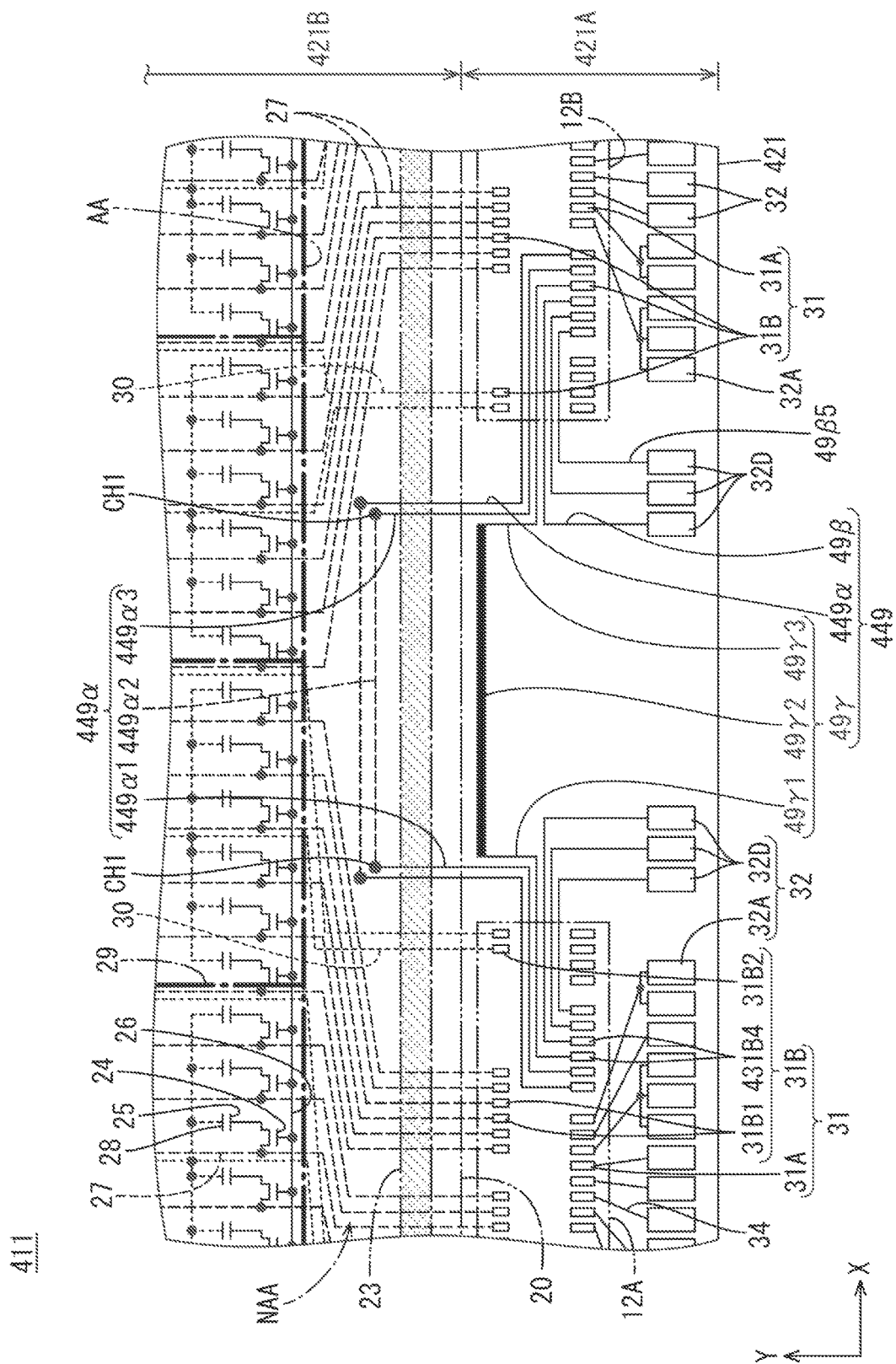
FIG. 12 is a plan view of a portion of a liquid crystal panel.

As illustrated in FIG. 12, the synchronization lines 449 include first synchronization lines 449α, second synchronization lines 49β, and a third synchronization line 49γ. The third synchronization line 49γ is disposed in the uncovered portion 21A of the array substrate 21. The control mark CM included in the first embodiment is not included in this embodiment. The third synchronization line 49γ is disposed between a first driver mounting area to which the first driver 12A is to be mounted and a second driver mounting area to which the second driver 12B is to be mounted. A portion of the third synchronization line 49γ has a width greater than a width of the first synchronization lines 449α.

The third synchronization line 49γ includes a first portion 49γ1, a second portion 49γ2, and a third portion 49γ3. The first portion 49γ1 and the third portion 49γ3 are coupled to the synchronization line output terminals 31B4 in the first driver mounting area and the second driver mounting area, respectively. The second portion 49γ2 has a width greater than the width of the first portion 49γ1 and the third portion 49γ3. The first portion 49γ1 extends from the synchronization line output terminal 31B4 in the first driver mounting area to an end of the second portion 49γ2 along the first portion 449α1 of the first synchronization lines 449α. The width of the first portion 49γ1 is about equal to the width of the first synchronization lines 449α. The second portion 49γ2 linearly extends in the X-axis direction. The section of the sealant 23 is between the second portion 449α2 of the first synchronization lines 449α with respect to the Y-axis direction. The third portion 49γ3 extends from another end of the second portion 49γ2 to the synchronization line output terminal 31B4 in the second driver mounting area along the third portion 449α3 of the first synchronization lines 449α. Although the second portion 49γ2 is not covered with the CF substrate 20, the second portion 49γ2 may be subject to damages or corrosion. Because the second portion 49γ2 has the greater width, the second portion 49γ2 is less likely to be broken. The synchronization lines 449 include the first synchronization lines 449α, the second synchronization lines 49β, and the third synchronization line 49γ thar are differently routed. According to the configurations, areas of an uncovered portion 421A and a covered portion 421B of the array substrate 421 for the synchronization lines 449 are reduced. To increase the number of the synchronization lines 449 due to the enhancement of the first driver 12A and the second driver 12B, the configurations are more preferable. Because the third synchronization line 49γ is disposed within the uncovered portion 421A, the greater width of the second portion 49γ2 is less likely to affect the arrangement of other components in the covered portion 421B. According to the configurations, the resistance of the third synchronization line 49γ can be reduced without affecting the arrangement of other components in the covered portion 421B.

Sixth Embodiment

A sixth embodiment will be described with reference to FIG. 13. A liquid crystal display device 510 according to the sixth embodiment includes a liquid crystal panel 511 that includes an array substrate 521 having a configuration different from the configuration of the array substrate 21 in the first embodiment. Configurations, functions, operation, and effects similar to those of the first embodiment will not be described.

Figure 13:
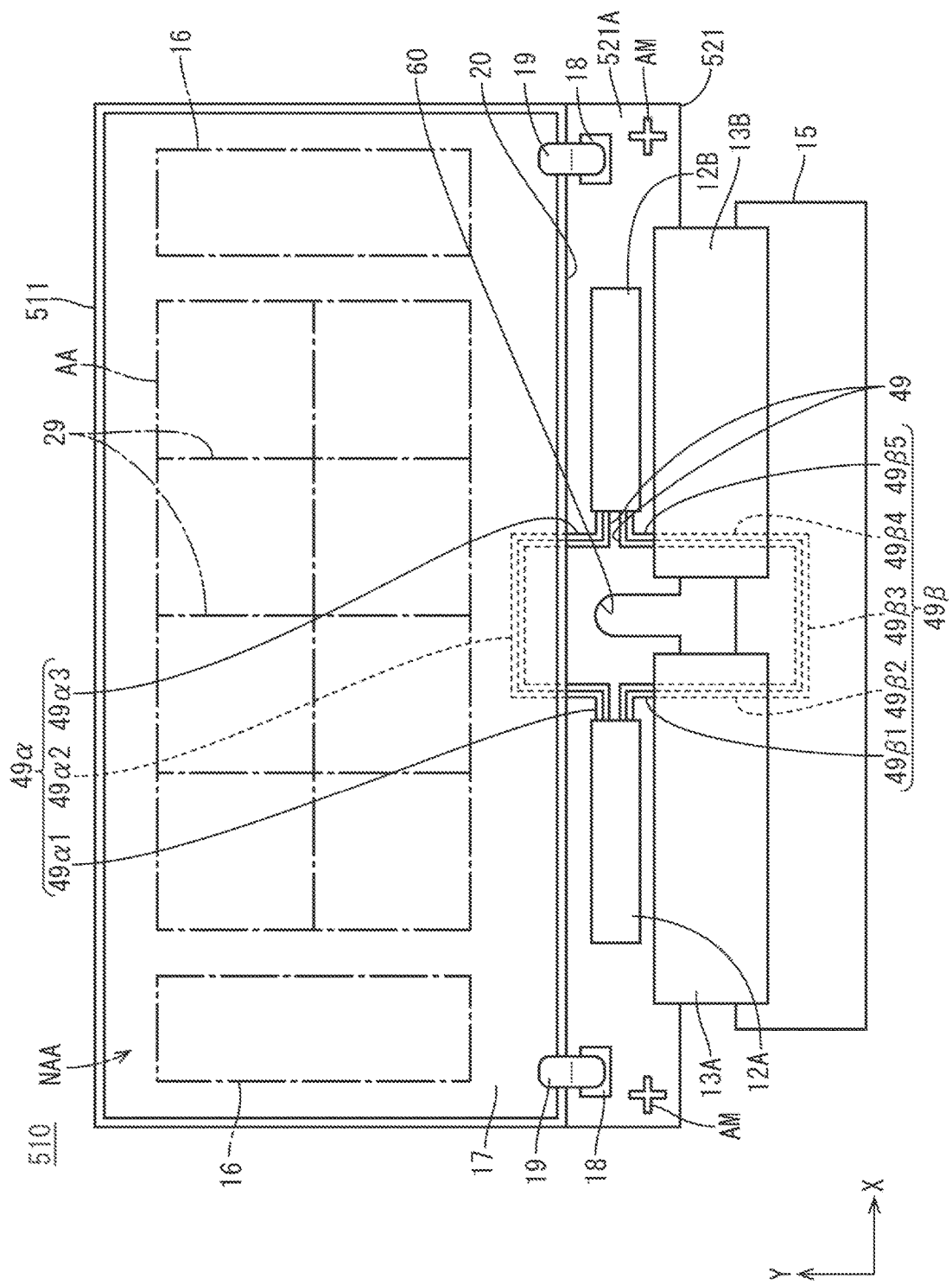
FIG. 13 is a plan view illustrating a liquid crystal panel, a flexible printed circuit board, and a printed circuit board.

As illustrated in FIG. 13, the array substrate 521 includes a notch 60 in an uncovered portion 521A that is not covered with the CF substrate 20. The notch 60 is located between the first driver 12A and the second driver 12B at about the middle of the uncovered portion 521A with respect to the X-axis direction. The notch 60 opens in a thickness direction of the array substrate 521 (the Z-axis direction) and includes openings in the front and the back surfaces of the uncovered portion 521A and a long edge of the uncovered portion 521A farther from the CF substrate 20. The first driver 12A, the second driver 12B, the first FPC board 13A, and the second FPC board 13B do not overlap the notch 60. Because the array substrate 521 includes the notch 60, the array substrate 521 does not include the control mark CM and the ground connector 18 between the first driver 12A and the second driver 12B included in the array substrate 21 in the first embodiment. With the notch 60, flexibility in design of the liquid crystal display device 510 improves. Components such as a camera and manual operation buttons may be disposed through the notch 60.

Because of the notch 60, the uncovered portion 521A may not have sufficient areas for the synchronization lines 49.

According to the configurations of the synchronization lines 49 described earlier and illustrated in FIGS. 1 and 13, the synchronization lines 49 are routed around the notch 60. That is, the notch 60 does not affect routing of the synchronization lines 49.

Seventh Embodiment

A seventh embodiment will be described with reference to FIG. 14. A liquid crystal display device 610 according to a seventh embodiment includes a FPC board 613 instead of the first FPC board 13A and the second FPC board 13B in the first embodiment. Furthermore, the liquid crystal display device 610 includes synchronization lines 649 that includes second synchronization lines 649β having configurations different from the configurations of the second synchronization lines 49β in the first embodiment. Configurations, functions, operation, and effects similar to those of the first embodiment will not be described.

Figure 14:
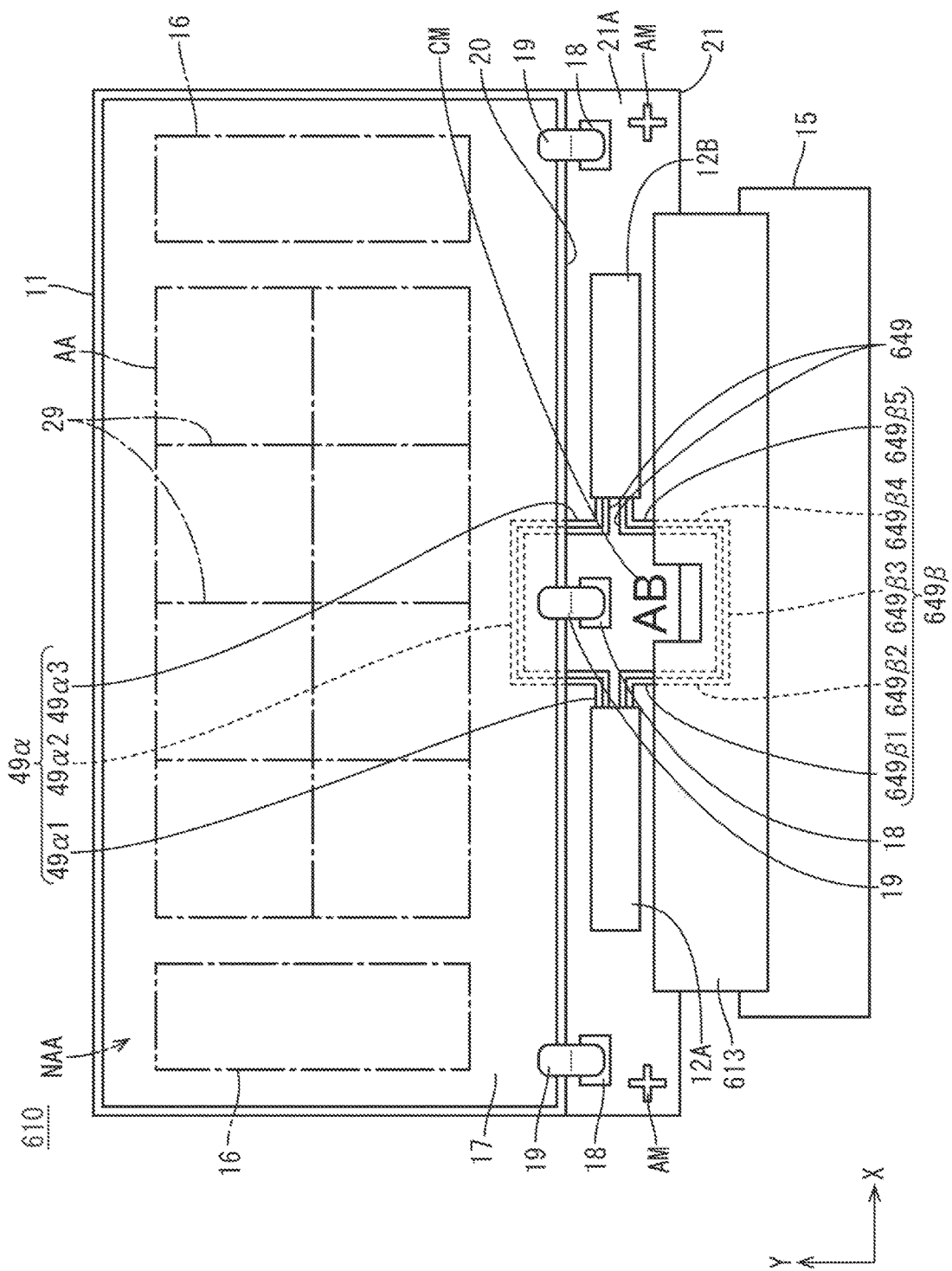
FIG. 14 is a plan view illustrating a liquid crystal panel, a flexible printed circuit board, and a printed circuit board.

As illustrated in FIG. 14, the FPC board 613 includes branches that are coupled to the array substrate 21. The number of the branches of the FPC board 613 is equal to the number of the drivers, that is, two. A portion of the FPC board 613 coupled to the PCB 15 does not include any branches. The second synchronization lines 649β are not routed on the PCB 15. The second synchronization lines 649β includes first portions 649β1, second portions 649β2, third portions 649β3, fourth portions 649β4, and fifth portions 649β5. The first portions 649β1 and the fifth portions 649β5 have configurations similar to the configurations of the first portions 649β1 and the fifth portions 649β5 in the first embodiment, respectively. The second portions 649β2, the third portions 649β3, and the fourth portions 649β4 are disposed in the FPC board 613. The second portions 649β2 and the fourth portions 649β4 are shorter than the second portions 49β2 and the fourth portions 49β4 in the first embodiment and the third portions 649β3 extend from ends of the second portions 649β2 to ends of the fourth portions 649β4 within the FPC board 613.

OTHER EMBODIMENTS

The technology described herein is not limited to the embodiments described in this specification and illustrated in the drawings. For example, the following embodiments may be included in the technical scope of the present invention.

(1) The number of the metal films included in the array substrate 21, 421, or 521 is not limited to three.

(2) Three or more drivers may be mounted on the array substrate 21, 421, or 521. Synchronization lines connecting three or more drives to each other may be included.

(3) The first driver 12A and the second driver 12B may be disposed adjacent to different edges of the array substrate 21, 421, or 521. In this case, the array substrate 21, 421, or 521 may include an L-shaped uncovered portion. The first driver 12A, the second driver 12B, and additional drivers may be disposed adjacent to different edges of the array substrate 21, 421, or 521. In this case, the array substrate 21, 421, or 521 may include a C-shaped uncovered portion or a frame-shaped uncovered portion.

(4) The shape of the liquid crystal panel 11 in a plan view is not limited to the rectangular shape. For example, the liquid crystal panel 11 may include a curved edge or an irregular edge. The first driver mounting area and the second driver mounting area may be adjacent to the curved edge.

(5) The number of the first synchronization lines 49α, 149α, 249α, 349α, or 449α is not limited to three. The number of the first synchronization lines 49α, 149α, 249α, 349α, or 449α may be different from the number of the second synchronization lines 49β or 649β. For example, the number of the first synchronization lines 49α, 149α, 249α, 349α, or 449α may be greater than the number of the second synchronization lines 49β or 649β. In this case, the number of the synchronization line terminals 32D in the FPC board mounting area(s) can be reduced and thus the width of the first FPC board 13A, the second FPC board 13B, or the FPC board 613 can be reduced. Even if the number of the first synchronization lines 49α, 149α, 249α, 349α, or 449α and the number of the second synchronization lines 49β or 649β are different from each other, the first synchronization lines 49α, 149α, 249α, 349α, or 449α may transmit the same kind of synchronization signals and the second synchronization lines 49β or 649β may transmit the same kind of synchronization signals.

(6) The kind of synchronization signals transmitted by the first synchronization lines 49α, 149α, 249α, 349α, or 449α and the kind of synchronization signals transmitted by the second synchronization lines 49β or 649β may be altered. For example, the first synchronization lines 49α, 149α, 249α, 349α, or 449α may transmit image synchronization signals and the second synchronization lines 49β or 649β may transmit time-dividing synchronization signals.

(7) Some of the first synchronization lines 49α, 149α, 249α, 349α, or 449α may transmit a different kind of synchronization signals. Some of the second synchronization lines 49β or 649β may transmit a different kind of synchronization signals.

(8) The touch panel pattern may use a mutual capacitance sensing method.

(9) The liquid crystal display device 10 or 510 may not have the touch panel function. In this case, the first synchronization lines 49α, 149α, 249α, 349α, or 449α and the second synchronization lines 49β or 649β may transmit image synchronization signals where appropriate.

(10) The first portions 49α1, 149α1, 249α1, 349α1, or 449α1 of the first synchronization lines 49α, 149α, 249α, 349α, or 449α may be routed to cross the long edge of the first driver mounting area. The third portions 49α3, 149α3, 249α3, 349α3, or 449α3 of the first synchronization lines 49α, 149α, 249α, 349α, or 449α may be routed to cross the long edge of the second driver mounting area. The first portions 49β1 or 649β1 of the second synchronization lines 49β or 649β may be routed to cross the long edge of the first driver mounting area. The fifth portions 49β5 or 649β5 of the second synchronization lines 49β or 649β may be routed to cross the long edge of the second driver mounting area. The first portions 49α1, 149α1, 249α1, 349α1, or 449α1 of the first synchronization lines 49α, 149α, 249α, 349α, or 449α and the first portions 49β1 or 649β1 of the second synchronization lines 49β or 649β may be routed to cross different edges of the first driver mounting area. The third portions 49α3, 149α3, 249α3, 349α3 or 449α3 of the first synchronization lines 49α, 149α, 249α, 349α, or 449α and the fifth portions 49β5 or 649β5 of the second synchronization lines 49β or 649β may be routed to cross different edges of the second driver mounting area.

(11) The first portions 49α1, 149α1, 249α1, 349α1, or 449α1 of the first synchronization lines 49α, 149α, 249α, 349α, or 449α may include split ends including first split ends and second split ends. The first split ends may be routed to cross the short edge of the first driver mounting area and second split ends may be routed to cross the long edge of the first driver mounting area. The third portions 49α3, 149α3, 249α3, 349α3, or 449α3 of the first synchronization lines 49α, 149α, 249α, 349α, or 449α may include split ends including first split ends and second split ends. The first split ends may be routed to cross the short edge of the second driver mounting area and second split ends may be routed to cross the long edge of the second driver mounting area. The first portions 49β1 or 649β1 of the second synchronization lines 49β or 649β may include slit ends including first split ends and second split ends. The first split ends may be routed to cross the short edge of the first driver mounting area and second split ends may be routed to cross the long edge of the first driver mounting area. The fifth portions 49β5 or 649β5 of the second synchronization lines 49β or 649β may include slit ends including first split ends and second split ends. The first split ends may be routed to cross the short edge of the second driver mounting area and second split ends may be routed to cross the long edge of the second driver mounting area.

(12) The first portions 49α1, 149α1, 249α1, 349α1, or 449α1 and the third portions 49α3, 149α3, 249α3, 349α3, or 449α3 of the first synchronization lines 49α, 149α, 249α, 349α, or 449α may be formed from the second metal film 40, 140, or 240 or the third metal film 42 or 242. The first portions 49α1, 149α1, 249α1, 349α1, or 449α1 and the third portions 49α3, 149α3, 249α3, 349α3, or 449α3 of the first synchronization lines 49α, 149α, 249α, 349α, or 449α may have multilayer structure including the first metal film 38, 138, or 238 and another metal film or another transparent electrode film.

(13) The first portions 49β1 or 649β1 and the fifth portions 49β5 or 649β5 of the second synchronization lines 49β or 649β may be formed from the second metal film 40, 140, or 240 or the third metal film 42 or 242. The first portions 49β1 or 649β1 and the fifth portions 49β5 or 649β5 of the second synchronization lines 49β or 649β may have multilayer structure including the first metal film 38, 138, or 238 and another metal film or another transparent electrode film.

(14) The CF substrate 20 and the array substrate 21, 421, or 521 may include resin substrates having flexibility rather than the glass substrates. The CF substrate 20 and the array substrate 21, 421, or 521 may include substrates made of different materials. For example, the array substrate 21, 421, or 521 may include a glass substrate and the CF substrate 20 may include a resin film substrate. The array substrate 21, 421, or 521 may include a glass substrate or a resin substrate and the CF substrate 20 may include a resin fil formed on the array substrate 21, 421, or 521 by spattering or coating.

(15) The positions of the control mark CM and the ground connectors 18 in the uncovered portion 21A, 421A, or 521A of the array substrate 21, 421, or 521 can be altered where appropriate.

(16) The number of the first contact holes CH1 or the number of the second contact holes CH2 may be altered where appropriate for improvement in connection reliability.

(17) The auxiliary portions 149α4 of the first synchronization lines 149α may be disposed not to overlap the second portions 149α2.

(18) The auxiliary portions 149α4 of the first synchronization lines 149α may be formed from the third metal film 42.

(19) The first synchronization lines 149α may include fifth portions formed from the third metal film 42 disposed in the covered portion 21B of the array substrate 21 in addition to the second portions 149α2 and the auxiliary portions 149α4. The fifth portions may be disposed to overlap the second portions 149α2 and the auxiliary portions 149α4 or not overlap the second portions 149α2 and the auxiliary portions 149α4.

(20) The dummy lines 50 may be formed from the first metal film 238. In this case, the first sections 51 and the third sections 53 of the second portions 249α2 of the first synchronization lines 249α may be formed from the first metal film 238. The second sections 52 of the second portions 249α2 of the first synchronization lines 249α may be formed from the second metal film 240 or the third metal film 242. The dummy lines 50 may be formed from the third metal film 242. In this case, the first sections 51 and the third sections 53 of the second portions 249α2 of the first synchronization lines 249α may be formed from the third metal film 242. The second sections 52 of the second portions 249α2 of the first synchronization lines 249α may be formed from the first metal film 238 or the second metal film 240.

(21) The total number of the first sections 54 and the second sections 55 greater than three may be included in each second portion 349α2.

(22) Two or more third synchronization lines 49γ may be included in the synchronization lines 449.

(23) The second portion 49γ2 of the third synchronization line 49γ may have a width equal to the width of the first synchronization lines 449α. Alternatively, the third synchronization line 49γ may have a constant width greater than the width of the first synchronization lines 449α.

(24) The CF substrate 20 included in the liquid crystal display device 510 may include a notch. The shape of the notch 60 of the array substrate 521 or the CF substrate 20 may be altered from the shape illustrated in FIG. 13.

(25) The second synchronization lines 49β or 649β may be omitted. The synchronization lines 49, 149, 249, 349, 449, or 649 may include only the first synchronization lines 49α, 149α, 249α, 349α, or 449α or the first synchronization lines 49α, 149α, 249α, 349α, or 449α and the third synchronization line 49γ.

(26) An oxide semiconductor or an amorphous semiconductor may be used for the semiconductor film. The sequence of the layers on the array substrate 21, 421, or 521 may be altered where appropriate. For example, the first metal film 38, 138, or 238, the gate insulator film 37, the second metal film 40, 140, or 240, the planarization film 41 or 241, the third metal film 42, the first transparent electrode film 43, the interlayer insulator film, the second transparent electrode film 45 may be disposed in this sequence from the array substrate 21, 421, or 521. In this case, the TFTs 24 may be bottom gate type TFTs including gate electrodes in a layer lower than channels.

(27) The conductive layer 17 may be omitted and the polarizing plate 14 may have electric conductivity. In this case, the conductors 19 may be coupled to the polarizing plate 14 having electric conductivity.

(28) The touch lines 30 may be disposed not to overlap the source lines 27.

(29) The sealant 23 may be made of a visible light curable resin material, a thermosetting resin material, or a thermoplastic resin.

(30) The first gate circuit 16A and the second gate circuit 16B may be omitted. In this case, gate drivers having the same function as the function of the first gate circuit 16A and the second gate circuit 16B may be mounted on the array substrate 21, 421, or 521. The first gate circuit 16A and the second gate circuit 16B may be disposed adjacent to one of the edges of the array substrate 21, 421, or 521.

(31) The pixel electrodes 25 may be formed from the second transparent electrode film 45 and the common electrode 28 (the touch electrodes 29) may be formed from the first transparent electrode film 43. In this case, the pixel electrodes 25 may include slits for orientation control of the liquid crystal molecules.

(32) The liquid crystal panel 11 may operates in twisted nematic (TN) mode, vertical alignment (VA) mode, or in-plane switching (IPS) mode.

(33) The liquid crystal panel 11 may be a transmissive liquid crystal panel, a semi-transmissive liquid crystal panel, or a reflective liquid crystal panel.

(34) The technology described herein may be applied to organic electro luminescence (EL) display device including organic EL display panels.

What is claimed is:

1. A display device comprising:
a first member having a plate shape and including a display area within a plate surface of the first member;
a second member having a plate shape and including a plate surface greater than the plate surface of the first member and a display area within the plate surface of the second member, the second member including a covered portion covered with the first member and an uncovered portion not covered with the first member;
image signal lines disposed at least in the covered portion to transmit image signals;
at least two signal sources mounted to signal source mounting areas of the uncovered portion separated from each other to supply the image signals to the image signal lines;
synchronization line terminals disposed in the signal source mounting areas, the synchronization line terminals being coupled to the at least two signal source;
synchronization lines disposed in the covered portion and the uncovered portion and coupled to the synchronization line terminals respectively to transmit synchronization signals for synchronizations of the at least two signal sources, some of the synchronization lines extending to cross a border between the covered portion and the uncovered portion;
at least one flexible printed circuit board coupled to a section of the uncovered portion on an opposite side from the covered portion relative to the at least two signal sources; and
a printed circuit board coupled to the at least one flexible printed circuit board, wherein
the some of the synchronization lines extending to cross the border between the covered portion and the uncovered portion are defined as first synchronization lines,
the synchronization lines include second synchronization lines disposed in the uncovered portion and the at least one flexible printed circuit board to cross a border between the uncovered portion and the at least one flexible printed circuit board,
the at least one flexible printed circuit board includes a first flexible printed circuit board and a second flexible printed circuit board,
the first flexible printed circuit board and the second flexible printed circuit board are separated from each other in a direction in which the at least two signal sources are separated,
the first flexible printed circuit board includes a first end coupled to a first section included in the section of the uncovered portion and a second end coupled to the printed circuit board,
the second flexible printed circuit board includes a first end coupled to a second section included in the section of the uncovered portion and a second end coupled to the printed circuit board,
some of the second synchronization lines are disposed in the uncovered portion, the first flexible printed circuit board, and the printed circuit board to cross a border between the uncovered portion and the first flexible printed circuit board and a border between the first flexible printed circuit board and the printed circuit board, and
some of the second synchronization lines are disposed in the uncovered portion, the second flexible printed circuit board, and the printed circuit board to cross a border between the uncovered portion and the second flexible printed circuit board and a border between the second flexible printed circuit board and the printed circuit board.

2. The display device according to claim 1, wherein
the some of the synchronization lines extending to cross the border between the covered portion and the uncovered portion include at least:
first portions extending to cross the border between the covered portion and the uncovered portion and including ends coupled to the synchronization line terminals; and
second portions extending within the covered portion,
the first portions and the second portions of the first synchronization lines are formed from a first conductive film and a second conductive film, respectively, and
the second portions include first sections and second sections that are parallel to each other.

3. The display device according to claim 1, further comprising a sealant disposed between an edge area of the first member and an edge area of the covered portion of the second member to surround an internal space between the first member and the covered portion of the second member and to seal the internal space, wherein
the some of the synchronization lines extending to cross the border between the covered portion and the uncovered portion include at least:
first portions extending to cross the border between the covered portion and the uncovered portion and the sealant; and
second portions extending within the covered portion and parallel to the sealant, and
the first portions include ends coupled to the synchronization line terminals.

4. The display device according to claim 1, wherein
the synchronization lines further include
third synchronization lines that are disposed in the uncovered portion to extend within the uncovered portion and that have a width greater than a width of the first synchronization lines.

5. The display device according to claim 4, further comprising:
position detecting electrodes disposed in the covered portion to detect a position of input by a position input member, each of the position detecting electrodes and the position input member form a capacitor; and
position detecting lines disposed in the covered portion and the uncovered portion to cross the border between the covered portion and the uncovered portion and coupled to the at least two signal sources and the position detecting electrodes to transmit position detecting signals.

6. The display device according to claim 1, further comprising:
- a conductive layer disposed on a surface of the first member on an opposite side from the second member;
- at least one ground connector disposed on the uncovered portion and coupled to a ground; and
- at least one conductor disposed on the first member and the uncovered portion to cross a border between the first member and the uncovered portion and coupled to the at least one ground connector, wherein
- the at least one ground connector is disposed between the at least two signal sources.

7. The display device according to claim 1, wherein the uncovered portion includes a control mark between the signal sources for production control.

8. The display device according to claim 1, wherein the uncovered portion includes a notch between the at least two signal sources.

9. A display device comprising:
- a first member having a plate shape and including a display area within a plate surface of the first member;
- a second member having a plate shape and including a plate surface greater than the plate surface of the first member and a display area within the plate surface of the second member, the second member including a covered portion covered with the first member and an uncovered portion not covered with the first member;
- image signal lines disposed at least in the covered portion to transmit image signals;
- at least two signal sources mounted to signal source mounting areas of the uncovered portion separated from each other to supply image signals to the image signal lines;
- synchronization line terminals disposed in the signal source mounting areas, the synchronization line terminals being coupled to the at least two signal sources; and
- synchronization lines disposed in the covered portion and the uncovered portion and coupled to the synchronization line terminals respectively to transmit synchronization signals for synchronizations of the at least two signal sources, some of the synchronization lines extending to cross a border between the covered portion and the uncovered portion, wherein
- the first synchronization lines include at least:
  - first portions extending to cross the border between the covered portion and the uncovered portion and including ends coupled to the synchronization line terminals; and
  - second portions extending within the covered portion,
- the first portions and the second portions of the first synchronization lines are formed from a first conductive film and a second conductive film, respectively,
- the second conductive film has a resistance less than a resistance of the first conductive film,
- the first synchronization lines further include auxiliary portions disposed within the covered portion of the second member,
- the auxiliary portions are formed from the second conductive film,
- the auxiliary portions overlap the second portions of the first synchronization lines, and
- the display device further comprises an insulator film disposed between the second portions and the auxiliary portions of the first synchronization lines.

10. The display device according to claim 9, further comprising dummy lines disposed in an area of the covered portion in which the image signal lines are not disposed, wherein
- the dummy lines extend along the image signal lines and cross the second portions of the first synchronization lines,
- the dummy lines are not coupled to the image signal lines, the at least two signal sources, the first synchronization lines, and the second synchronization line,
- the second portions of the first synchronization lines include sections that cross the dummy lines,
- the sections of the second portions of the first synchronization lines are formed from a third conductive film disposed in a layer different from the dummy lines, and
- the display device further comprises an insulator film disposed between the second portions of the first synchronization lines and the dummy lines.

11. The display device according to claim 9, wherein
the some of the synchronization lines extending to cross the border between the covered portion and the uncovered portion include at least:
- first portions extending to cross the border between the covered portion and the uncovered portion and including ends coupled to the synchronization line terminals; and
- second portions extending within the covered portion,
- the first portions and the second portions of the first synchronization lines are formed from a first conductive film and a second conductive film, respectively, and
- the second portions include first sections and second sections that are parallel to each other.

12. The display device according to claim 9, further comprising a sealant disposed between an edge area of the first member and an edge area of the covered portion of the second member to surround an internal space between the first member and the covered portion of the second member and to seal the internal space, wherein
- the some of the synchronization lines extending to cross the border between the covered portion and the uncovered portion include at least:
  - first portions extending to cross the border between the covered portion and the uncovered portion and the sealant; and
  - second portions extending within the covered portion and parallel to the sealant, and
- the first portions include ends coupled to the synchronization line terminals.

13. The display device according to claim 9, wherein
the some of the synchronization lines extending to cross the border between the covered portion and the uncovered portion are defined as first synchronization lines,
the synchronization lines include:
- second synchronization lines disposed in the uncovered portion and the at least one flexible printed circuit board to cross a border between the uncovered portion and the at least one flexible printed circuit board; and
- third synchronization lines being disposed in the uncovered portion to extend within the uncovered portion and having a width greater than a width of the first synchronization lines.

14. The display device according to claim 13, further comprising:
- position detecting electrodes disposed in the covered portion to detect a position of input by a position input member, each of the position detecting electrodes and the position input member form a capacitor; and position detecting lines disposed in the covered portion and the uncovered portion to cross the border between the covered portion and the uncovered portion and coupled to the at least two signal sources and the position detecting electrodes to transmit position detecting signals.

15. The display device according to claim 9, further comprising:

a conductive layer disposed on a surface of the first member on an opposite side from the second member;

at least one ground connector disposed on the uncovered portion and coupled to a ground; and at least one conductor disposed on the first member and the uncovered portion to cross a border between the first member and the uncovered portion and coupled to the at least one ground connector, wherein the at least one ground connector is disposed between the at least two signal sources.

16. The display device according to claim 9, wherein the uncovered portion includes a control mark between the signal sources for production control.

17. The display device according to claim 9, wherein the uncovered portion includes a notch between the at least two signal sources.

18. A display device comprising:

a color filter substrate having a plate shape and including a display area within a plate surface of the color filter substrate, the color filter substrate including color filters;

an array substrate having a plate shape and including a plate surface greater than the plate surface of the color filter substrate and a display area within the plate surface of the array substrate, the array substrate including a covered portion covered with the color filter substrate and an uncovered portion not covered with the color filter substrate;

image signal lines disposed at least in the covered portion to transmit image signals;

a first signal source mounted to a first signal source mounting area of the uncovered portion and coupled to a first group of the image signal lines;

a second signal source mounted to a second signal source mounting area of the uncovered portion separated from the first signal source mounting area and coupled to a second group of the image signal lines;

synchronization line terminals coupled to the first signal source and the second signal source, the synchronization line terminals coupled to the first signal source being disposed in the first signal source mounting area, the synchronization line terminals coupled to the second signal source being disposed in the second signal source mounting area;

synchronization lines disposed at least in the uncovered portion and coupled to the synchronization line terminals respectively to transmit synchronization signals for synchronizations of the first signal source and the second signal source, the synchronization lines including:

first synchronization lines disposed in the covered portion and the uncovered portion to cross a border between the covered portion and the uncovered portion; and second synchronization lines disposed in the uncovered portion but not in the covered portion;

a printed circuit board disposed adjacent to an edge of the array substrate such that the first signal source and the second signal source are between the border and the printed circuit board, the printed circuit board being separated from the edge of the array substrate;

a first flexible printed circuit board mounted to an edge portion of the array substrate adjacent to the first signal source and the printed circuit board; and a second flexible printed circuit board mounted to an edge portion of the array substrate adjacent to the second signal source and the printed circuit board, wherein the first synchronization lines include:

first portions being coupled to the synchronization line terminals in the first signal source mounting area and extending from the first signal source mounting area to the covered portion to cross the border between the uncovered portion and the covered portion;

second portions extending from ends of the first portions within the covered portion; and third portions extending from ends of the second portions to the second signal source mounting area to cross the border between the covered portion and the uncovered portion and being coupled to the synchronization line terminals in the second signal source mounting area, the second synchronization lines include:

first portions disposed in the uncovered portion and coupled to the first signal source;

second portions disposed in the first flexible printed circuit board, the second portions extending from the first portions;

third portions disposed in the printed circuit board, the third portions extending from the second portions;

fourth portions disposed in the second flexible printed circuit board, the fourth portions extending from the third portions; and fifth portions disposed in the uncovered portion and coupled to the second signal source, the fifth portions extending from the fourth portions.

19. The display device according to claim 18, further comprising:

a conductive layer disposed on the plate surface of the color filter substrate;

a ground connector disposed between the first signal source and the second signal source on the uncovered portion and coupled to a ground;

a conductor connecting the conductive layer to the ground connector.

20. The display device according to claim 19, wherein the uncovered portion includes a control mark between the first signal source and the second signal source for production control.

* * * * *